US012149317B2

(12) United States Patent
Svedman et al.

(10) Patent No.: US 12,149,317 B2
(45) Date of Patent: Nov. 19, 2024

(54) BEAM FAILURE RECOVERY ON A NON-FAILED CELL

(71) Applicant: InterDigital Patent Holdings, Inc., Wilmington, DE (US)

(72) Inventors: Patrick Svedman, Chevy Chase, MD (US); Mohamed Awadin, Plymouth Meeting, PA (US); Allan Y. Tsai, Boonton, NJ (US); Qing Li, Princeton Junction, NJ (US); Pascal M. Adjakple, Great Neck, NY (US); Yifan Li, Conshohocken, PA (US); Guodong Zhang, Woodbury, NY (US); Lakshmi R. Iyer, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 340 days.

(21) Appl. No.: 17/289,051

(22) PCT Filed: Oct. 31, 2019

(86) PCT No.: PCT/US2019/059137
§ 371 (c)(1),
(2) Date: Apr. 27, 2021

(87) PCT Pub. No.: WO2020/092752
PCT Pub. Date: May 7, 2020

(65) Prior Publication Data
US 2021/0409091 A1    Dec. 30, 2021

Related U.S. Application Data

(60) Provisional application No. 62/753,995, filed on Nov. 1, 2018.

(51) Int. Cl.
*H04B 7/06*    (2006.01)
*H04L 5/00*    (2006.01)
(Continued)

(52) U.S. Cl.
CPC ......... *H04B 7/0695* (2013.01); *H04L 5/0051* (2013.01); *H04W 72/1268* (2013.01);
(Continued)

(58) Field of Classification Search
CPC ........ H04B 7/06; H04B 7/0695; H04B 7/088; H04B 7/08; H04B 17/318; H04B 7/0626;
(Continued)

(56) References Cited

U.S. PATENT DOCUMENTS 6,768,913 B1   7/2004   Molnar et al.
7,349,371 B2   3/2008   Schein et al.
(Continued)

FOREIGN PATENT DOCUMENTS

CN    101583196 A    11/2009
CN    101873601 A    10/2010
(Continued)

OTHER PUBLICATIONS

LG Electronics, "Discussion on multi-beam based operations and enhancements", 3GPP TSG RAN WG1 Meeting #94bis, Oct. 2018, R1-1810303, pp. 8.
(Continued)

*Primary Examiner* — Man U Phan
(74) *Attorney, Agent, or Firm* — Flaster Greenberg, P.C.

(57) ABSTRACT

Methods and systems are disclosed for a more flexible use of bandwidth parts (BWP) and cells for the various transmissions within the BFR procedure, such as the UL beam failure recovery request (BFRQ) and the DL beam failure recovery response (BFRR). The proposed framework allows these transmission to occur in BWPs with different Id, as well as on different cells. Example benefits include support for BFR on DL-only SCells by allowing the BFR UL transmissions on another cell with UL, support for sequential/parallel multi-cell BFRQ for improved BFR reliability (Continued)

and latency performance, and support for less UE-initiated BWP switching for BFR.

18 Claims, 25 Drawing Sheets

(51) Int. Cl.
 *H04W 72/1268* (2023.01)
 *H04W 72/23* (2023.01)
 *H04W 76/19* (2018.01)
 *H04W 80/02* (2009.01)

(52) U.S. Cl.
 CPC ........... *H04W 72/23* (2023.01); *H04W 76/19* (2018.02); *H04W 80/02* (2013.01)

(58) Field of Classification Search
 CPC ... H04B 17/336; H04B 7/0617; H04W 76/19; H04W 80/02; H04W 72/12; H04W 72/14; H04W 16/28; H04W 56/001; H04W 74/0833; H04W 72/1284; H04W 74/04; H04W 24/10
 USPC ........................................................ 370/329
 See application file for complete search history.

(56) References Cited

U.S. PATENT DOCUMENTS

| | | |
|---|---|---|
| 8,111,656 B2 | 2/2012 | Che et al. |
| 8,565,179 B2 | 10/2013 | Noh et al. |
| 8,825,095 B2 | 9/2014 | Tong et al. |
| 8,913,682 B2 | 12/2014 | Nam et al. |
| 9,642,126 B2 | 5/2017 | Park et al. |
| 9,647,805 B2 | 5/2017 | Gerlach et al. |
| 9,730,138 B2 | 8/2017 | Wang et al. |
| 9,749,968 B2 | 8/2017 | Stern-Berkowitz et al. |
| 10,257,864 B2 | 4/2019 | Zhao et al. |
| 10,700,752 B2 | 6/2020 | Jung et al. |
| 10,848,230 B2 * | 11/2020 | Lu ........................ H04B 7/0695 |
| 10,979,127 B2 * | 4/2021 | Zhang ................... H04W 16/28 |
| 10,985,825 B2 | 4/2021 | Xiong et al. |
| 11,006,441 B2 * | 5/2021 | Shih ...................... H04B 7/0695 |
| 11,184,080 B2 * | 11/2021 | Nagaraja ................ H04B 7/088 |
| 11,312,433 B2 * | 4/2022 | Weisbruch ............. F16J 15/344 |
| 11,329,711 B2 * | 5/2022 | Koskela ................. H04B 7/022 |
| 11,336,357 B2 * | 5/2022 | Koskela ................. H04B 7/088 |
| 11,337,265 B2 * | 5/2022 | Zhou ................... H04L 27/2692 |
| 11,368,995 B2 * | 6/2022 | Wu ....................... H04B 7/0695 |
| 11,419,173 B2 * | 8/2022 | Deenoo ................. H04W 72/23 |
| 11,470,631 B2 * | 10/2022 | Matsumura ........... H04L 5/0048 |
| 11,595,103 B2 * | 2/2023 | Matsumura ......... H04W 56/001 |
| 2002/0159506 A1 | 10/2002 | Alamouti et al. |
| 2009/0170514 A1 | 7/2009 | Yokoyama |
| 2009/0175161 A1 | 7/2009 | Yi et al. |
| 2009/0280867 A1 | 11/2009 | Hovers et al. |
| 2010/0067470 A1 | 3/2010 | Damnjanovic et al. |
| 2010/0267341 A1 | 10/2010 | Bergel et al. |
| 2011/0268049 A1 | 11/2011 | Luo et al. |
| 2012/0026913 A1 | 2/2012 | Reznik et al. |
| 2012/0040684 A1 | 2/2012 | Gao et al. |
| 2012/0076042 A1 | 3/2012 | Chun et al. |
| 2012/0287875 A1 | 11/2012 | Kim |
| 2012/0300714 A1 | 11/2012 | Ng et al. |
| 2013/0021952 A1 | 1/2013 | Jeong et al. |
| 2013/0029657 A1 | 1/2013 | Gao et al. |
| 2013/0039345 A1 | 2/2013 | Kim et al. |
| 2013/0040684 A1 | 2/2013 | Yu et al. |
| 2013/0083774 A1 | 4/2013 | Son et al. |
| 2013/0102345 A1 | 4/2013 | Jung |
| 2013/0121185 A1 | 5/2013 | Li et al. |
| 2013/0155847 A1 | 6/2013 | Li et al. |
| 2013/0182683 A1 | 7/2013 | Seol et al. |
| 2013/0196678 A1 | 8/2013 | Liu et al. |
| 2013/0265899 A1 | 10/2013 | Sayana et al. |
| 2013/0272220 A1 | 10/2013 | Ying et al. |
| 2013/0286960 A1 | 10/2013 | Li et al. |
| 2013/0301542 A1 | 11/2013 | Krishnamurthy |
| 2013/0308714 A1 | 11/2013 | Xu et al. |
| 2013/0316721 A1 | 11/2013 | Lan et al. |
| 2013/0336176 A1 | 12/2013 | Rubin et al. |
| 2013/0342846 A1 | 12/2013 | Campagne et al. |
| 2014/0003240 A1 | 1/2014 | Chen et al. |
| 2014/0016573 A1 | 1/2014 | Nuggehalli et al. |
| 2014/0029684 A1 | 1/2014 | Shirani-Mehr et al. |
| 2014/0092855 A1 | 4/2014 | Ahn et al. |
| 2014/0112254 A1 | 4/2014 | Lindoff et al. |
| 2014/0112269 A1 | 4/2014 | Yu et al. |
| 2014/0153427 A1 | 6/2014 | Seo et al. |
| 2014/0177607 A1 | 6/2014 | Li et al. |
| 2014/0293898 A1 | 10/2014 | Tseng |
| 2015/0105025 A1 | 4/2015 | Zhang et al. |
| 2015/0382205 A1 | 12/2015 | Lee et al. |
| 2016/0001403 A1 | 1/2016 | Matsumoto et al. |
| 2016/0080058 A1 | 3/2016 | Kang et al. |
| 2017/0034812 A1 | 2/2017 | Deng et al. |
| 2017/0055190 A1 | 2/2017 | Takano |
| 2017/0207843 A1 | 7/2017 | Jung et al. |
| 2017/0280481 A1 | 9/2017 | Stern-Berkowitz et al. |
| 2018/0006770 A1 | 1/2018 | Guo et al. |
| 2018/0167883 A1 | 6/2018 | Guo et al. |
| 2018/0219604 A1 | 8/2018 | Lu et al. |
| 2018/0227899 A1 | 8/2018 | Yu et al. |
| 2018/0278310 A1 | 9/2018 | Lee et al. |
| 2018/0279286 A1 | 9/2018 | Akoum et al. |
| 2018/0323856 A1 | 11/2018 | Xiong et al. |
| 2019/0335522 A1 | 10/2019 | Zhang et al. |
| 2020/0099437 A1 | 3/2020 | Harada et al. |
| 2020/0120704 A1 | 4/2020 | Wang et al. |
| 2020/0170027 A1 | 5/2020 | Yang et al. |
| 2020/0186218 A1 | 6/2020 | Wu et al. |
| 2020/0404638 A1 | 12/2020 | Deogun et al. |
| 2022/0061087 A1 * | 2/2022 | Koskela ................. H04W 72/21 |

FOREIGN PATENT DOCUMENTS

| | | |
|---|---|---|
| CN | 101924610 A | 12/2010 |
| CN | 102083228 A | 6/2011 |
| CN | 102405603 A | 4/2012 |
| CN | 102415121 A | 4/2012 |
| CN | 102548016 A | 7/2012 |
| CN | 102696183 A | 9/2012 |
| CN | 102714807 A | 10/2012 |
| CN | 103155622 A | 6/2013 |
| CN | 103155678 A | 6/2013 |
| CN | 103588583 A | 2/2014 |
| CN | 103597765 A | 2/2014 |
| CN | 103905346 A | 7/2014 |
| CN | 103988551 A | 8/2014 |
| CN | 104105212 A | 10/2014 |
| CN | 104137440 A | 11/2014 |
| CN | 104521312 A | 4/2015 |
| CN | 105359427 A | 2/2016 |
| CN | 106416346 A | 2/2017 |
| CN | 107079459 A | 8/2017 |
| CN | 108462515 A | 8/2018 |
| CN | 108632837 A | 10/2018 |
| CN | 108702767 A | 10/2018 |
| CN | 109121223 A | 1/2019 |
| CN | 109391344 A | 2/2019 |
| CN | 104955606 B | 5/2019 |
| EP | 2939349 A1 | 11/2015 |
| EP | 3264631 A1 | 1/2018 |
| WO | WO 2010/033989 A1 | 3/2010 |
| WO | WO 2010/054378 A1 | 5/2010 |
| WO | WO 2014/104758 A1 | 7/2014 |
| WO | WO 2014/116928 A1 | 7/2014 |
| WO | WO 2014/172306 A2 | 10/2014 |
| WO | WO 2016/086114 A1 | 6/2016 |
| WO | WO 2016/086144 A1 | 6/2016 |
| WO | 2017/024516 A1 | 2/2017 |
| WO | WO 2017/123060 A1 | 7/2017 |
| WO | WO 2017/151876 A1 | 9/2017 |

(56) References Cited

FOREIGN PATENT DOCUMENTS

| WO | 2018/129300 A1 | 7/2018 |
|---|---|---|
| WO | 2018/164332 A1 | 9/2018 |
| WO | 2018/190617 A1 | 10/2018 |

OTHER PUBLICATIONS

CMCC, Consideration on measurement and reporting of L1-RSRQ/L1-SINR, 3GPP TSG RAN WG1 #94b R1-1811049, Oct. 2018, pp. 3.
Intel Corporation, "On Beam Management Enhancement", 3GPP TSG RAN WG1 Meeting #94b, R1-1810791, Oct. 2018, pp. 11.
Intel Corporation, "Remaining Issues on Beam Management", 3GPP TSG RAN WG1 #94 R1-1808669, Aug. 2018, pp. 16.
NEC, "Discussion on Beam Failure Recovery", R1-1810805, 3GPP TSG RAN WG1 Meeting #94b, Oct. 2018, pp. 2.
Intel Corporation: "On SCell Beam Failure Recovery", 3GPP Draft; R1-1808720 On Scell Beam Failure Recovery, 3rd Generation Partnership Project (3GPP), Mobile Competence Centre' 650, Route Des Lucioles; F-06921 Sophia-Antipolis Cedex; France, vol. RAN WG1, No. Gothenburg, Sweden; Aug. 20, 2018-Aug. 24, 2018, Aug. 11, 2018, XP051516094.
Intel Corporation: "Summary on SCell BFR and Beam Measurement", 3GPP Draft; R1-1811853 Summary On Scell BFR and Beam Measurement, 3rd Generation Partnership Project (3GPP), Mobile Competence Centre ; 650, Route Des Lucioles; F-06921 Sophia-Antipolis Cedex; France, vol. RAN WG1, No. Chengdu, China; Oct. 8, 2018-Oct. 12, 2018, Oct. 10, 2018, XP051519178.
LG Electronics Inc., "BWP operation for BFR", 3GPP TSG-RAN WG2 Meeting #103, Aug. 2018, R2-1812639, pp. 1-3.
CN 101924610 A, English translation of Description and claims provided by Espacenet.com.
CN 102548016 A, English translation of Description and claims provided by Espacenet.com.
CN 102714807 A, English translation of Description and claims provided by Espacenet.com.
CN 108632837 A, English translation of Description and claims provided by Espacenet.com.
CN 109121223, English translation of Description and Claims provided by Google Patents.
CN 103905346, English translation of Description and Claims provided by Google Patents.
Alcatel-Lucent Shanghai Bell et al., "Considerations on CSI feedback enhancements for high-priority antenna configurations," 3GPP TSG-RAN WG1 #66, R1-112420, Athens, Greece (Aug. 22-26, 2011).
Ericsson AB et al., "Views on Rel-12—RWS-120003," pp. 1-13 (Jun. 1, 2012).
Han, "Research on DRX Algorithm based on LTE/LTE-Advanced System," China Master's Thesis Full-Text Database (CMFD) (Electronic Periodical) Information Science and Technology Section (Apr. 21, 2014).
Third Generation Partnership Project (3GPP), "LTE Release 12 and Beyond", 3GPP RAN WS on Rel-12 and onwards, Ljubljana, Slovenia, Jun. 11-12, 2012, RWS-120003, 10 pages.
Huawei et al., "Use scenarios for elevation beamforming," 3GPP TSG RAN WG1 Meeting #72, R1-130028, St. Julian's, Malta (Jan. 28 -Feb. 1, 2013).
Raaf et al., "Vision for Beyond 4G Broadband Radio Systems," IEEE 22nd International Symposium on Personal Indoor and Mobile Radio Communications (Sep. 2011).
Rappaport et al., "Millimeter Wave Mobile Communications for 5G Cellular: It Will Work!," IEEE Access, vol. 1, pp. 335-349 (May 2013).
Salkintzis et al., "The Evolution of Wireless LANs and PANs," IEEE Wireless Communications, vol. 10, Issue 6 (Dec. 2003).
Small cell enhancements for E-UTRA and E-UTRAN—Physical layer aspects (Release 12), 3GPP TR 36.872 V12.0.0 (Sep. 2013).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.4.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.8.0 (Dec. 2013).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.0.0 (Dec. 2013).
Third Generation Partnership Project, "Technical Specification Group Radio Access Network; Evolved Universal Terrestrial Radio Access (E-UTRA); Further advancements for E-UTRA physical layer aspects (Release 9)," 3GPP TR 36.814 V9.0.0 (Mar. 2010).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.10.0 (Dec. 2013).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.7.0 (Dec. 2012).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.0.0 (Sep. 2012).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.1.0.
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.4.0 (Dec. 2013).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.0.0 (Dec. 2013).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.7.0 (Dec. 2012).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.8.0 (Jun. 2013).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.1.0 (Dec. 2012).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.4.0 (Dec. 2013).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.0.0 (Dec. 2013).

(56) References Cited

OTHER PUBLICATIONS

Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group. Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.6.0 (Dec. 2012).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.0.0 (Sep. 2012).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.1.0 (Dec. 2012).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.5.0 (Dec. 2013).
Third Generation Partnership Project, "Technical Specification Group Radio Access Network; Evolved Universal Terrestrial Radio Access (E-UTRA); Physical Channels and Modulation (Release 12)," 3GPP TS 36.211 V12.0.0 (Dec. 2013).
Third Generation Partnership Project, "Technical Specification Group Radio Access Network; Evolved Universal Terrestrial Radio Access (E-UTRA); Physical channels and modulation (Release 12)," 3GPP TS 36.211 V12.3.0 (Sep. 2014).
Third Generation Partnership Project, "Technical Specification Group Radio Access Network; Evolved Universal Terrestrial Radio Access (E-UTRA); Physical channels and modulation (Release 12)," 3GPP TS 36.211 V12.7.0 (Sep. 2015).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical layer - Measurements (Release 8)," 3GPP TS 36.214 V8.7.0 (Sep. 2009).
Third Generation Partnership Project, "Technical Specification Group Radio Access Network; Evolved Universal Terrestrial Radio Access (E-UTRA); Physical layer procedures (Release 10)," 3GPP TS 36.213 V10.11.0 (Dec. 2013).
Third Generation Partnership Project, "Technical Specification Group Radio Access Network; Evolved Universal Terrestrial Radio Access (E-UTRA); Physical layer procedures (Release 10)," 3GPP TS 36.213 V10.8.0 (Dec. 2012).
Third Generation Partnership Project, "Technical Specification Group Radio Access Network; Evolved Universal Terrestrial Radio Access (E-UTRA); Physical layer procedures (Release 10)," 3GPP TS 36.213 V12.0.0 (Dec. 2013).
Third Generation Partnership Project, "Technical Specification Group Radio Access Network; Evolved Universal Terrestrial Radio Access (E-UTRA); Physical layer procedures (Release 11)," 3GPP TS 36.213 V11.0.0 (Sep. 2012).
Third Generation Partnership Project, "Technical Specification Group Radio Access Network; Evolved Universal Terrestrial Radio Access (E-UTRA); Physical layer procedures (Release 11)," 3GPP TS 36.213 V11.1.0 (Dec. 2012).
Third Generation Partnership Project, "Technical Specification Group Radio Access Network; Evolved Universal Terrestrial Radio Access (E-UTRA); Physical layer procedures (Release 11)," 3GPP TS 36.213 V11.5.0 (Dec. 2013).
Third Generation Partnership Project, "Technical Specification Group Radio Access Network; Evolved Universal Terrestrial Radio Access (E-UTRA); Physical layer procedures (Release 12)," 3GPP TS 36.213 V12.3.0 (Sep. 2014).
Third Generation Partnership Project, "Technical Specification Group Radio Access Network; Evolved Universal Terrestrial Radio Access (E-UTRA); Physical layer procedures (Release 12)," 3GPP TS 36.213 V12.7.0 (Sep. 2015).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer; Measurements (Release 10)," 3GPP TS 36.214 V10.1.0 (Mar. 2011).
Third Generation Partnership Project, "Technical Specification Group Radio Access Network; Evolved Universal Terrestrial Radio Access (E-UTRA); Physical layer; Measurements (Release 11)," 3GPP TS 36.214 V11.1.0 (Dec. 2012).
Third Generation Partnership Project, "Technical Specification Group Radio Access Network; Evolved Universal Terrestrial Radio Access (E-UTRA); Physical layer; Measurements (Release 9)," 3GPP TS 36.214 V9.2.0 (Jun. 2010).
Third Generation Partnership Project, "Technical Specification Group Radio Access Network; Evolved Universal Terrestrial Radio Access (E-UTRA); Radio Frequency (RF) system scenarios (Release 11)," 3GPP TR 36.942 V11.0.0 (Sep. 2012).
Third Generation Partnership Project, "Technical Specification Group Radio Access Network; Evolved Universal Terrestrial Radio Access (E-UTRA); Radio Frequency (RF) system scenarios (Release 12)," 3GPP TR 36.942 V12.0.0 (Sep. 2014).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.12.0 (Dec. 2013).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.8.0 (Dec. 2012).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.0.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.2.0 (Dec. 2012).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.6.0 (Dec. 2013).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.0.0 (Dec. 2013).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.3.0 (Sep. 2014).

(56) References Cited

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.7.0 (Sep. 2015).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.18.0 (Dec. 2012).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.20.0 (Jun. 2013).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.13.0 (Dec. 2012).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.17.0 (Dec. 2013).
Third Generation Partnership Project, "Technical Specification Group Radio Access Network; Evolved Universal Terrestrial Radio Access (E-UTRA); Requirements for support of radio resource management (Release 12)," 3GPP TS 36.133 V12.5.0 (Sep. 2014).
Third Generation Partnership Project, "Technical Specification Group Radio Access Network; Evolved Universal Terrestrial Radio Access (E-UTRA); Requirements for support of radio resource management (Release 12)," 3GPP TS 36.133 V12.9.0 (Sep. 2015).
Third Generation Partnership Project, "Technical Specification Group Radio Access Network; Evolved Universal Terrestrial Radio Access (E-UTRA); Requirements for support of radio resource management (Release 13)," 3GPP TS 36.133 V13.1.0 (Sep. 2015).
Third Generation Partnership Project, "Technical Specification Group Radio Access Network; Evolved Universal Terrestrial Radio Access (E-Utra); Tdd Home eNode B (HeNB) Radio Frequency (RF) requirements analysis (Release 10)," 3GPP TR 36.922 V10.0.0 (Apr. 2011).
Third Generation Partnership Project, "Technical Specification Group Radio Access Network; Small cell enhancements for E-UTRA and E-UTRAN - Physical layer aspects (Release 12)," 3GPP TR 36.872 V12.1.0 (Dec. 2013).
Third Generation Partnership Project, NR and NG-RAN Overall Description, Technical Specification Group Radio Access Network, NR, Stage 2, 3GPP TS 38.300, V15.3.1, Oct. 2018, 92 pages.
Third Generation Partnership Project, "Medium Access Control (MAC) protocol specification", Technical Specification Group Radio Access Network; Nr, 3GPP TS 38.321 V15.3.0, Sep. 2018, 76 pages.
Third Generation Partnership Project, "Physical layer procedures for control", Technical Specification Group Radio Access Network; NR, 3GPP TS 38.213, V15.3.0, Release 15, Sep. 2018, 101 pages.
Third Generation Partnership Project, "Radio Resource Control (RRC) protocol specification", Technical Specification Group Radio Access Network; NR, 3GPP TS 38.331, V15.3.0, Sep. 2018, 445 pages.
Third Generation Partnership Project, "LS Reply on Beam Failure Recovery", RAN1, Athens, Greece, Feb. 26-Mar. 2, 2018, 3GPP TSG RAN WG1 Meeting #92, R1-1803348, 2 pages.
Third Generation Partnership Project, "Summary of Email Discussion on Beam Failure Recovery on SCell", CATT, 3GPP TSG RAN WG1 Meeting #92, Athens, Greece, Feb. 26-Mar. 2, 2018, R1-1803397, 3 pages.
Third Generation Partnership Project, "Draft Reply LS on Beam Failure Recovery", RAN1, 3GPP TSG-RAN WG1 Meeting #93, Busan, Korea, May 21-25, 2018, R1-1807725, 2 pages.
Third Generation Partnership Project, "Revised WID: Enhancements on MIMO for NR", Samsung, 3GPP TSG RAN Meeting #81, Gold Coast, Australia, Sep. 10-13, 2018, RP-182067, 5 pages.

Third Generation Partnership Project, "Summary on SCell BFR and Beam Measurement", Intel Corporation, 3GPP TSG RAN WG1 Meeting #94b, Chengdu, China, Oct. 8-12, 2018, R1-1811853, 15 pages (on FIP).
3GPP TS 36.213 V14.3.0 , "Evolved Universal Terrestrial Radio Access (E-UTRA); Physical layer procedures (Release 14)", 3rd Generation Partnership Project; Technical Specification Group Radio Access Network, Jun. 2017, 460 pages.
3GPP TS 36.213 V14.7.0 , "Third Generation Partnership Project", Technical Specification Group Radio Access Network; Evolved Universal Terrestrial Radio Access (E-UTRA); Physical layer procedures (Release 14), Jun. 2018, 7 Pages.
3GPP TS 36.213 V15.2.0 , "Evolved Universal Terrestrial Radio Access (E-UTRA); Physical layer procedures (Release 15)", 3rd Generation Partnership Project; Technical Specification Group Radio Access Network, Jun. 2018, 7 pages.
3GPP TS 36.321 V13.1.0 , "Third Generation Partnership Project", Technical Specification Group Radio Access Network; Evolved Universal Terrestrial Radio Access (E-UTRA); Medium Access Control (MAC) protocol specification (Release 13), Mar. 2016, 85 Pages.
3GPP TS 36.321 V14.3.0 , "Third Generation Partnership Project", Technical Specification Group Radio Access Network; Evolved Universal Terrestrial Radio Access (E-UTRA); Medium Access Control (MAC) protocol specification (Release 14), Jun. 2017, 107 pages.
3GPP TS 36.321 V14.7.0 , "Third Generation Partnership Project", Technical Specification Group Radio Access Network; Evolved Universal Terrestrial Radio Access (E-UTRA); Medium Access Control (MAC) protocol specification (Release 14), Jul. 2018, 109 Pages.
3GPP TS 36.321 V15.2.0 , "Evolved Universal Terrestrial Radio Access (E-UTRA); Medium Access Control (MAC) protocol specification (Release 15)", 3rd Generation Partnership Project; Technical Specification Group Radio Access Network, Jul. 2018, 126 pages.
3GPP TS 36.331 V13.1.0 , "Third Generation Partnership Project", Technical Specification Group Radio Access Network; Evolved Universal Terrestrial Radio Access (E-UTRA); Radio Resource Control (RRC); Protocol specification (Release 13), Mar. 2016, 552 Pages.
3GPP TS 36.331 V14.3.0 , "Third Generation Partnership Project", Technical Specification Group Radio Access Network; Evolved Universal Terrestrial Radio Access (E-UTRA); Radio Resource Control (RRC); Protocol specification (Release 14), Jun. 2017, 745 pages.
3GPP TS 36.331 V14.7.0 , "Third Generation Partnership Project", Technical Specification Group Radio Access Network; Evolved Universal Terrestrial Radio Access (E-UTRA); Radio Resource Control (RRC); Protocol specification (Release 14), Jun. 2018, 772 Pages.
3GPP TS 36.331 V15.2.2 , "Third Generation Partnership Project", Technical Specification Group Radio Access. Network; Evolved Universal Terrestrial Radio Access (E-UTRA); Radio Resource Control (RRC); Protocol specification (Release 15), Jun. 2018, 791 pages.
3GPP TS 38.213 V15.2.0 , "NR; Physical layer procedures for control (Release 15)", 3rd Generation Partnership Project; Technical Specification Group Radio Access Network, Jun. 2018, 98 pages.
3GPP TS 38.321 V0.0.4 , "Third Generation Partnership Project", Technical Specification Group Radio Access Network; NR; Medium Access Control (MAC) protocol specification (Release 15), Jun. 2017, 31 Pages.
3GPP TS 38.321 V15.2.0 , "NR; Medium Access Control (MAC) Protocol Specification (Release 15)", 3rd Generation Partnership Project; Technical Specification Group Radio Access Network, Jun. 2018, 73 pages.
IEEE 802.11AF-2013 , "Part 11: Wireless LAN Medium Access Control (MAC) and Physical Layer (PHY) Specifications Amendment 5: Television White Spaces (TVWS) Operation", IEEE Standard for Information technology—Telecommunications and information exchange between systems Local and metropolitan area networks—Specific requirements, Dec. 11, 2013, 198 pages.

(56) References Cited

OTHER PUBLICATIONS

IEEE STD 802.11 N-2009, "Part 11: Wireless LAN Medium Access Control (MAC) and Physical Layer (PHY) Specifications", IEEE Standard for Information technology—Telecommunications and information exchange between systems—Local and metropolitan area networks—Specific requirements, Amendment 5: Enhancements for Higher Throughput, Sep. 11, 2009, 536 Pages.

IEEE STD 802.11AC-2013, "Part 11: Wireless LAN Medium Access Control (MAC) and Physical Layer (PHY) Specifications Amendment 4: Enhancements for Very High Throughput for Operation in Bands below 6GHz", IEEE Standard for Information technology—Telecommunications and information exchange between systems—Local and metropolitan area networks—Specific requirements, Dec. 11, 2013, 425 pages.

IEEE STD 802.11AH-2016, "Part 11: Wireless LAN Medium Access Control (MAC) and Physical Layer (PHY) Specifications", IEEE Standard for Information technology—Telecommunications and information exchange between systems Local and metropolitan area networks—Specific requirements, Amendment 2: Sub 1 GHz License Exempt Operation, Dec. 7, 2016, 594 pages.

IEEE STD. 802.Nov. 2016, "Part 11: Wireless LAN Medium Access Control (MAC) and Physical Layer (PHY) Specifications", IEEE Standard for Information technology—Telecommunications and information exchange between systems—Local and metropolitan area networks—Specific requirements; Part 11,, Dec. 7, 2016, 3534 pages.

Nokia, et al., "SCell Beam Failure Recovery", 3GPP TSG-RAN WG2 Meeting #101bis, R2-1805342, Sanya, China, Apr. 16-20, 2018, 3 Pages.

R1-1705893, "Beam failure detection and beam recovery actions", 3GPP TSG-RAN WG1 Meeting #88bis; Ericsson, Apr. 3-7, 2017, 5 Pages.

R2-1704646, "Discussion on beam link failure", ZTE Corporation, Meeting #98, R2-1704646, Hangzhou, P. R. China, May 15-19, 2017, 5 Pages.

R2-1706718, "RAN2 aspects of DL beam management", 3GPP TSG-RAN WG2 Meeting NR#2; Qingdao, Jun. 27-29, 2017, 4 Pages.

R2-1706905, "Resource configuration for beam failure recovery request", 3GPP TSG-RAN WG2 Meeting#AH; Qingdao, China; Lenovo, Motorola Mobility, Jun. 27-29, 2017, 4 Pages.

Gang Xie, Beijing University of Posts and Telecommunications Press, "Principles and Applications of WiMAX Technology", Dec. 2010.

\* cited by examiner

BEAM FAILURE RECOVERY ON A NON-FAILED CELL

CROSS-REFERENCE TO RELATED APPLICATIONS

This application is the National Stage Application of International Patent Application No. PCT/US2019/059137, filed Oct. 31, 2019 which claims the benefit of U.S. Provisional Application No. 62/753,995, filed Nov. 1, 2018, titled "Beam Failed Recovery On A Non-Failed Cell," the content of which is hereby incorporated by reference in its entirety.

BACKGROUND

Beam failure detection and recovery procedures may be supported on a Special Cell (SpCell) (e.g., PCell or PSCell) as discussed in NR Rel-15. However, they are not supported on a Secondary Cell (SCell). Beam failure recovery (BFR) in NR Rel-15 may use either contention-free random access (CFRA) or contention-based random access (CBRA). The UE may use CFRA for BFR if the UE has been configured with a candidate Reference Signal (RS) (with associated CFRA resources) on the active UL Band Width Part (BWP), and the measured Reference Signal Received Power (RSRP) for at least one of the candidate RS is above a threshold. Note that there may be different configurable thresholds for a Channel State Information-Reference signal (CSI-RS) and a Synchronization Signal/PBCH Block (SSB). Otherwise, the UE may use a CBRA on the initial UL BWP and initial DL BWP for BFR. Note that the UE may need to perform candidate RS measurements (e.g., new beam identification) after Beam Failure Detection (BFD), depending on the UE implementation, which means that recovery cannot start right after BFD. Some UEs may perform NBI prior to the BFD event, which means that recovery can start right after BFD.

SUMMARY

Disclosed herein are methods and systems that address the insufficiently flexible beam failure recovery (BFR) framework in NR. Several enhancements are disclosed to support improved efficiency and robustness. The use cases involving BFR for DL-only SCell and BFR for URLLC are addressed for the case of a multi-carrier capable UE.

The solutions are based on a more flexible use of bandwidth parts (BWP) and cells for the various transmissions within the BFR procedure, in particular the UL beam failure recovery request (BFRQ) and the DL beam failure recovery response (BFRR). The proposed framework allows these transmission to occur in BWPs with different Id, as well as on different cells. Example benefits include support for BFR on DL-only SCells by allowing the BFR UL transmissions on another cell with UL, support for sequential/parallel multi-cell BFRQ for improved BFR reliability and latency performance, and support for less UE-initiated BWP switching for BFR, potentially avoiding resulting packet losses.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Example Communication System and Networks

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 1A:
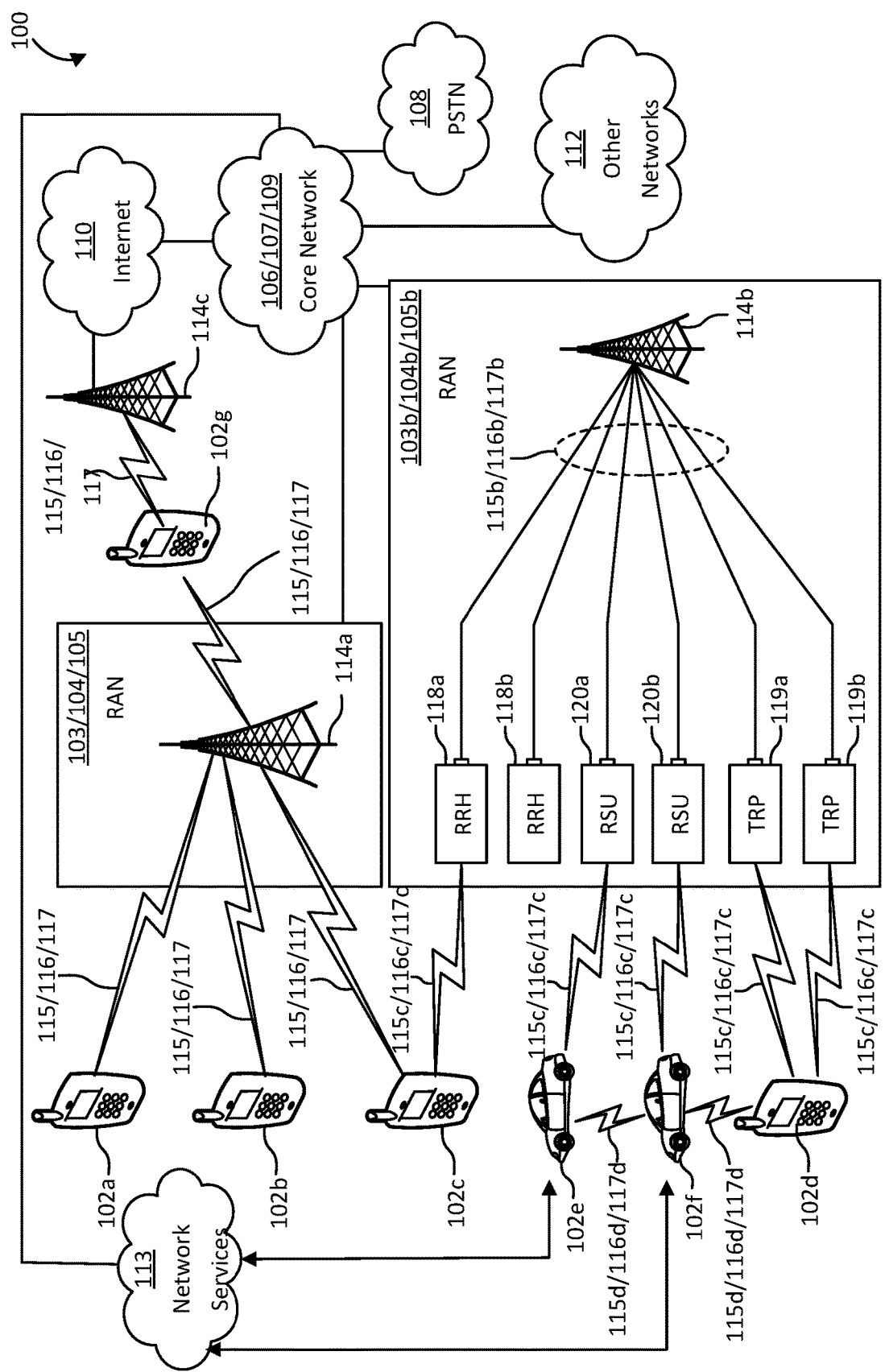
FIG. 1A illustrates an example communications system.

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
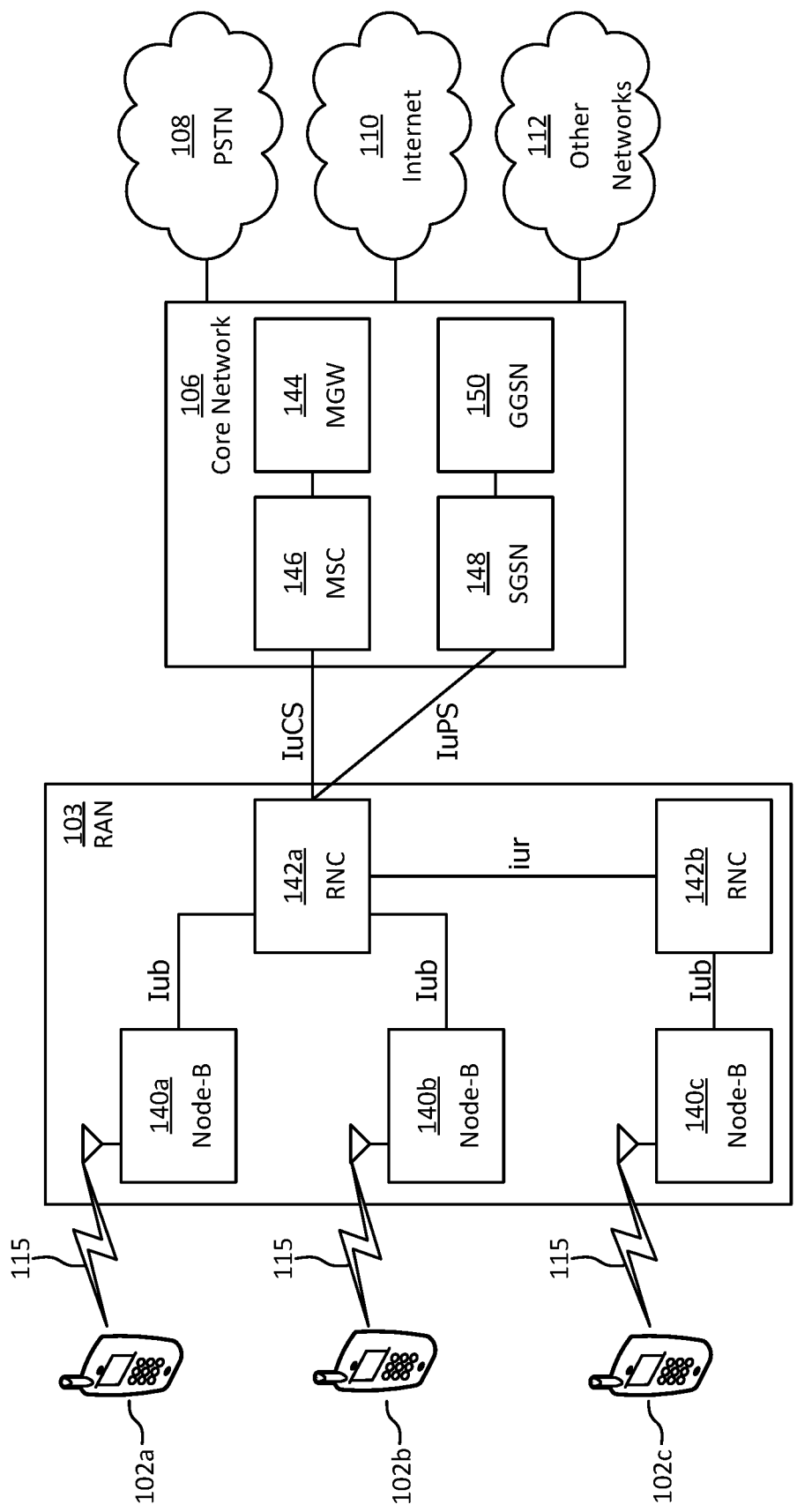
FIGS. 1B, 1C, and 1D are system diagrams of example RANs and core networks.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
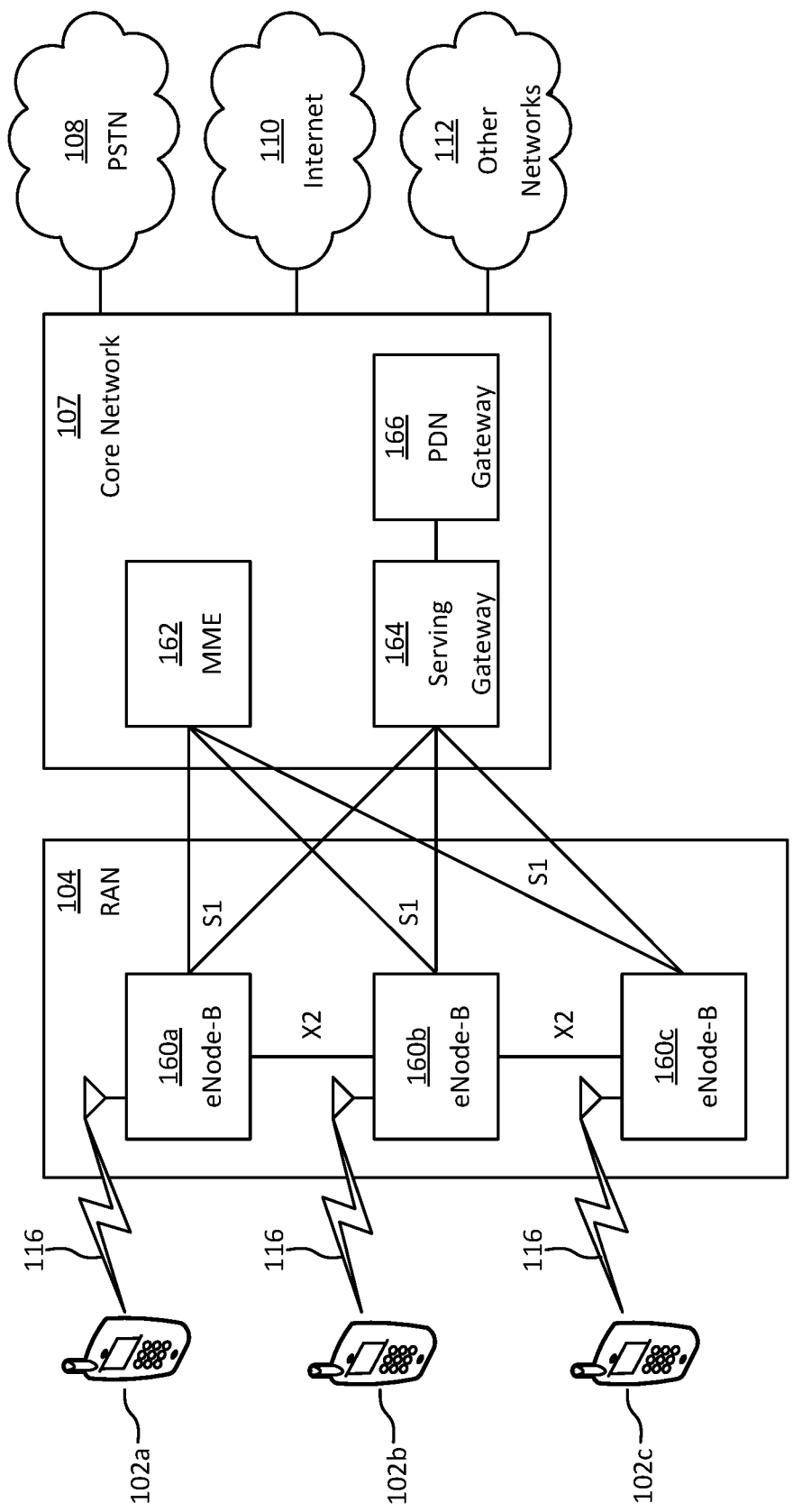

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
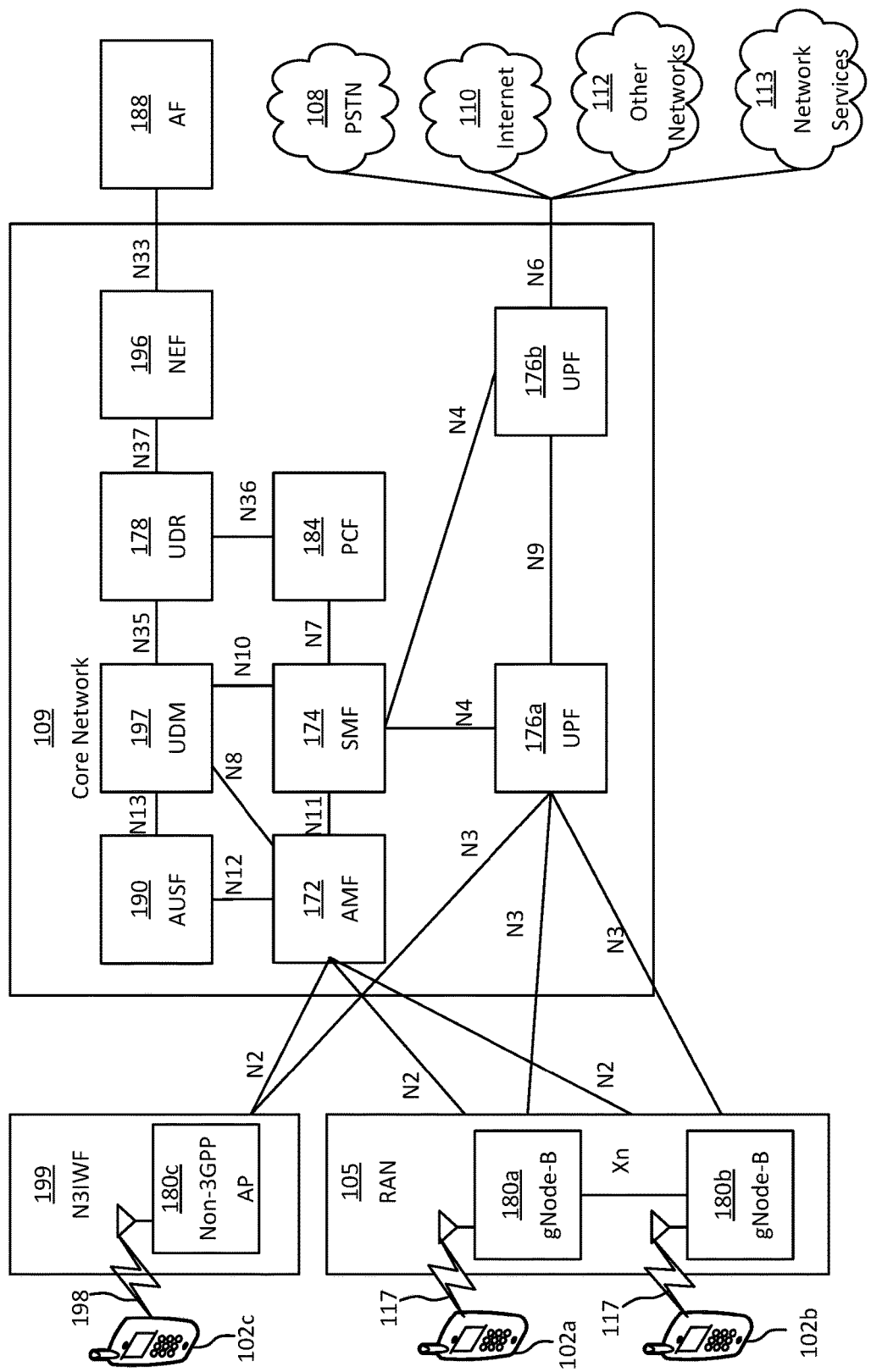

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. x1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3 IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184 may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
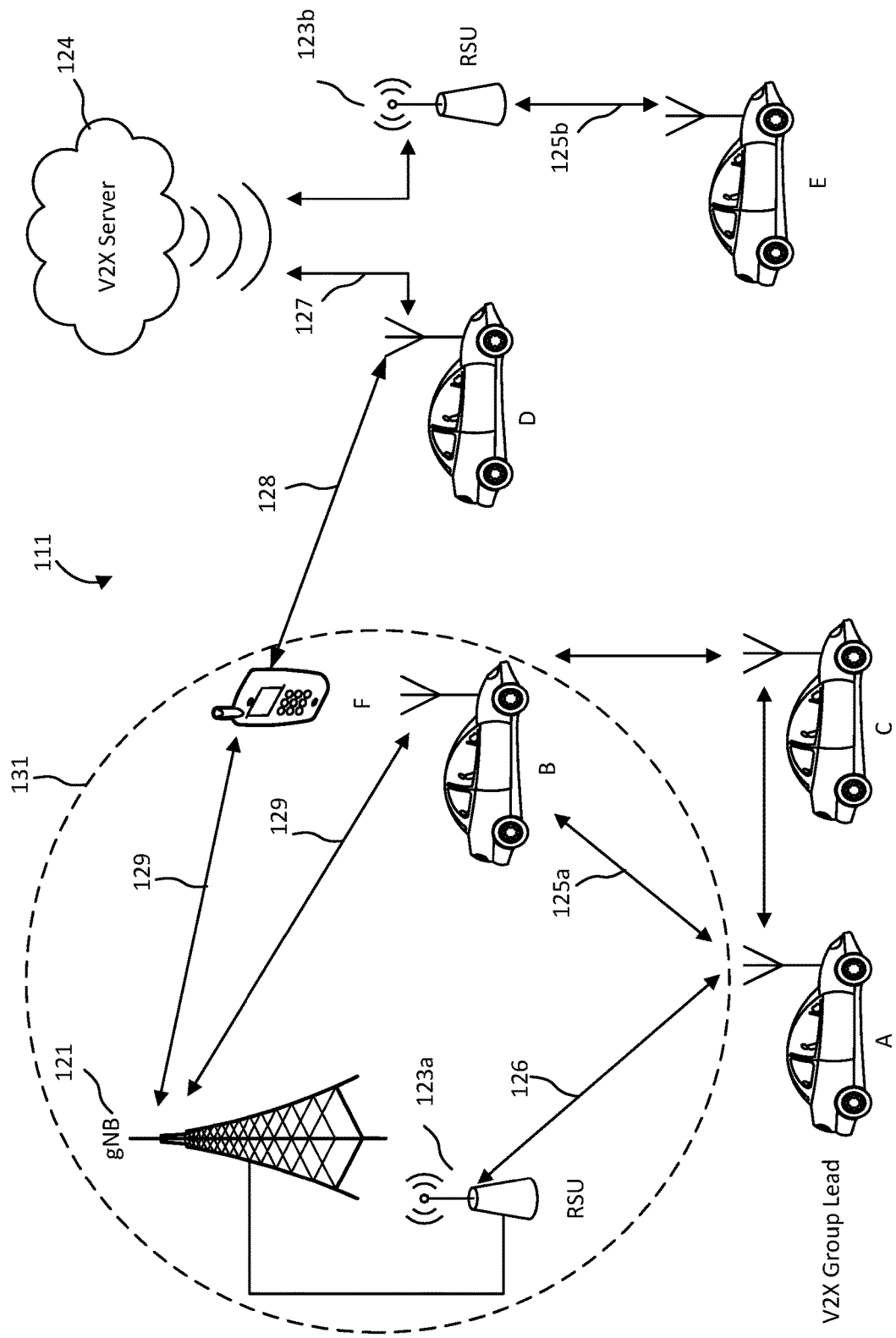
FIG. 1E illustrates another example communications system.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 1E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 1E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
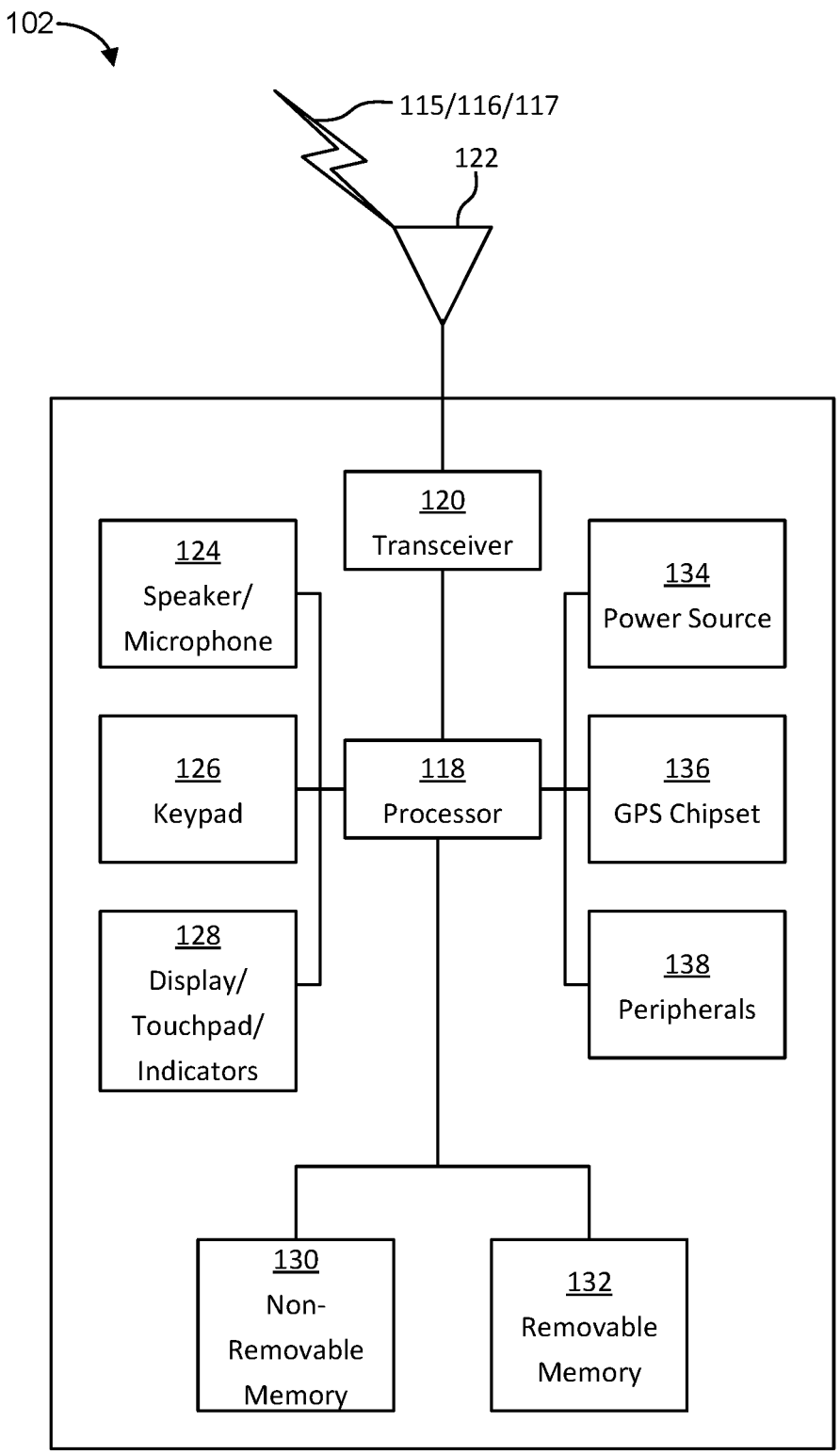
FIG. 1F is a block diagram of an example apparatus or device, such as a WTRU.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
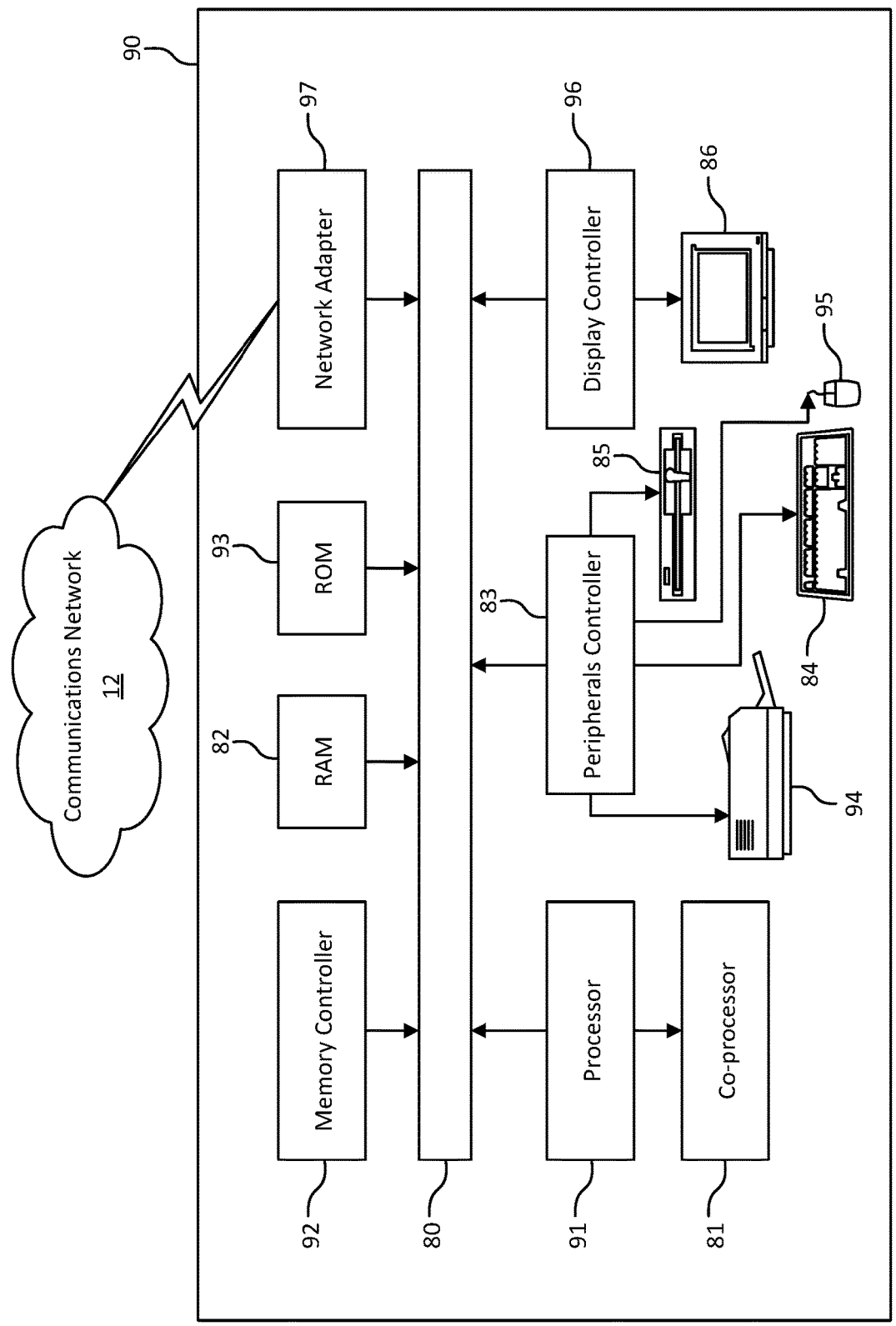
FIG. 1G is a block diagram of an exemplary computing system.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Beam Failure Recovery Procedure in NR-Rel 15

Figure 2:
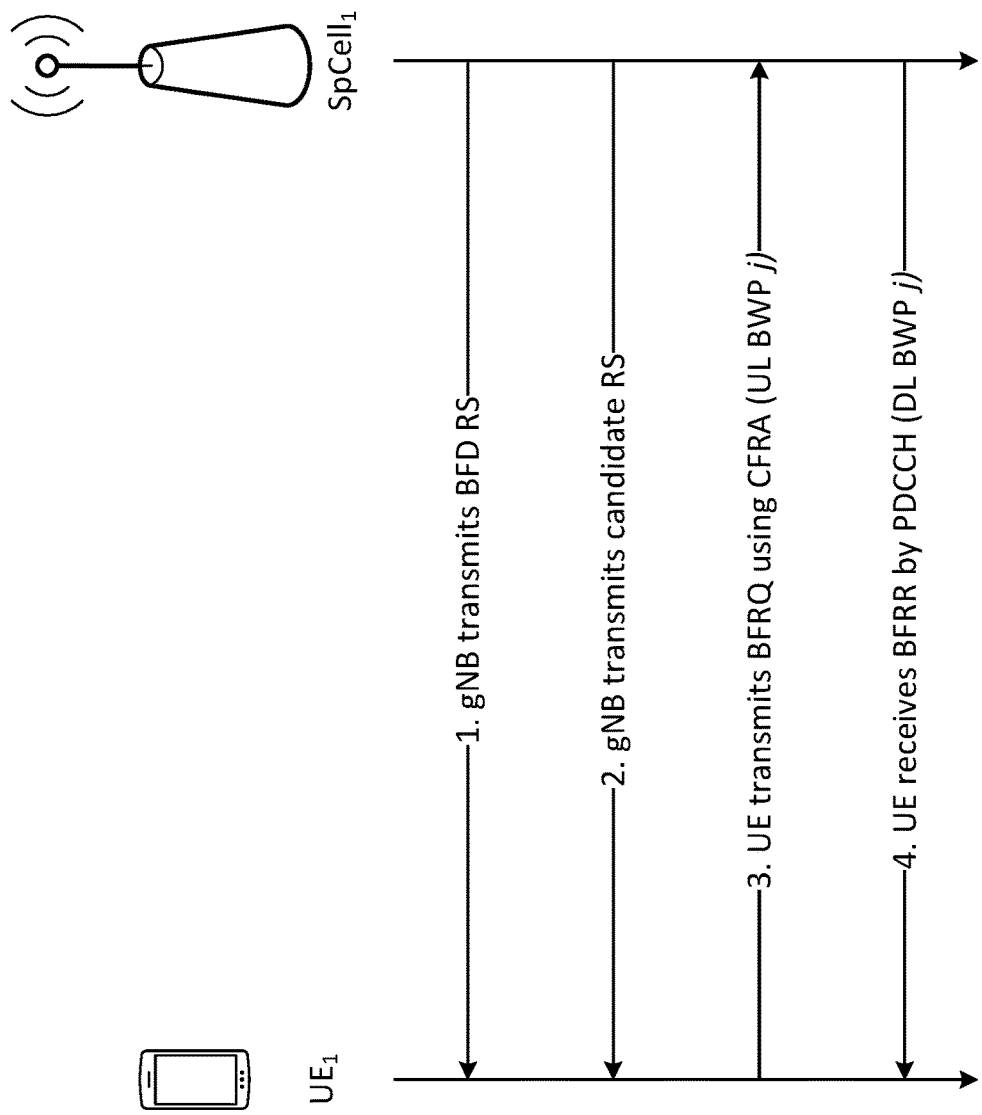
FIG. 2 shows a flowchart of an example beam failure recovery procedure based on CFRA according to NR Rel-15.

An example Rel-15 BFR procedure based on CFRA is shown in FIG. 2, with the following steps. In the beginning of the procedure, a UE has an active Down Link (DL) BWP i and an active UL BWP j.

At step 1, the gNB periodically transmits BFD RS (CSI-RS). The Non-zero Power (NZP) CSI-RS resources may be configured in the ServingCellConfig IE. The Information Element (IE) RadioLinkMonitoringConfig in the BWP-DownlinkDedicated IE selects BFD RS among the configured NZP CSI-RS in the cell.

At step 2, the gNB periodically transmits candidate RS. The IE BeamFailureRecoveryConfig in the BWP-UplinkDedicated IE selects CSI-RS among the NZP CSI-RS and SSB in the cell.

At step 3, after detecting beam failure based on the BFD RS, the UE selects one of the candidate RS with RSRP above a threshold (rsrp-ThresholdSSB or rsrp-Threshold-CSI-RS) (note that this step may involve additional candidate RS measurement, also called new beam identification (NBI), as the UE might not monitor any or some of the candidate RS prior to BFD), the UE switches from DL BWP i to DL BWP j (same BWP Id as the active UL BWP j), and the UE transmits PRACH on active UL BWP j using a dedicated resource associated with the selected candidate RS.

At step 4, the UE monitors the RecoverySearchSpace for PDCCH on DL BWP j, assuming Quasi Co-location (QCL) with the selected candidate RS. The beam failure recovery response may be a PDCCH with CRC scrambled by the UE's C-RNTI (or MCS-C-RNTI).

Figure 3:
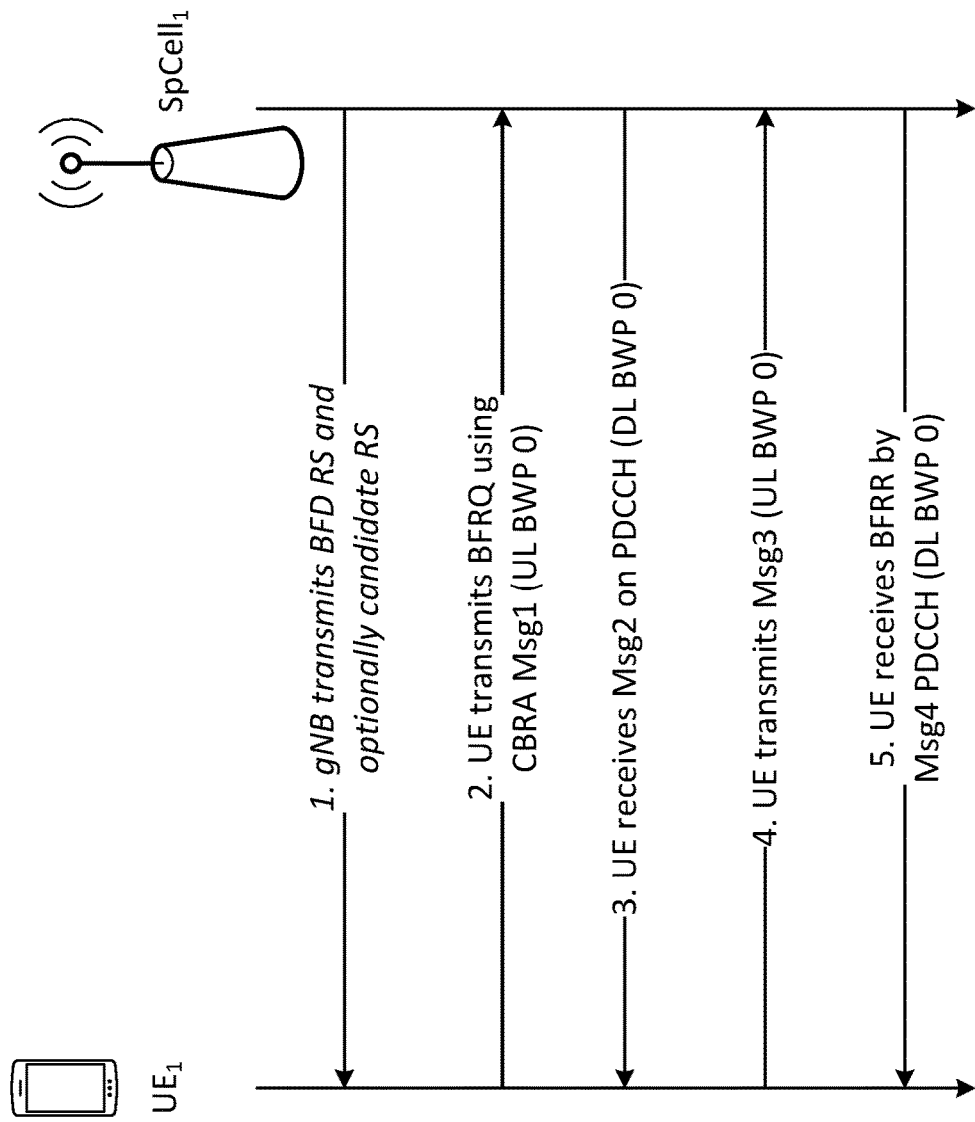
FIG. 3 shows a flowchart of an example beam failure recovery procedure based on CBRA according to NR Rel-15.

An example Rel-15 BFR procedure based on CBRA is shown in FIG. 3, with the following steps. In the beginning of the procedure, the UE has an active DL BWP i and an active UL BWP j.

At step 1, the gNB periodically transmits BFD RS and optionally a candidate RS, as described above.

At step 2, if the UE is not configured with a candidate RS for the active UL BWP j (and thereby there are no corresponding CFRA resources) OR no candidate RS has RSRP above the threshold (rsrp-ThresholdSSB or rsrp-Threshold-CSI-RS) (note that this step may involve additional candidate RS measurement), the UE may switch DL/UL BWPs to BWP 0 for CBRA (initial DL/UL BWPs). The UE may select an SSB (with RSRP above threshold) and transmit PRACH on the UL BWP 0, according to CBRA.

At step 3, the UE receives Msg2 on the DL BWP 0 according to CBRA, assuming QCL with the selected SSB.

At step 4, the UE transmits Msg3 on the UL BWP 0 according to CBRA and includes the C-RNTI MAC CE.

At step 5, the UE receives Msg4 PDCCH with CRC scrambled by the UE's C-RNTI, assuming QCL with the selected SSB.

BFR in NR Rel-15 has limited flexibility. For example, it is only supported on SpCells, and the CFRA-based BFR is only supported on the UL BWP that is active when the beam failure is detected. This may result in inefficient BWP operation and use of semi-statically allocated BFR resources. Hence, a more flexible use of BWPs during BFR can improve system efficiency.

Furthermore, it is not possible to perform parts of the BFR procedure on other cell(s) than the cell on which beam failure was detected. For example, a UE with multi-carrier capability could perform BFRQ on another cell (e.g., an SCell or the SpCell) in the same or different cell group as the failed cell. This could improve system efficiency and robustness since BFR may involve semi-static allocation of UL resources (e.g., CFRA or PUCCH resources) and potential DL transmission on a failed cell. Hence, a more flexible beam failure recovery framework for NR is attractive, both within a cell and across multiple cells.

A typical deployment scenario configures cells in FR2 as SCell with an FR1 cell as PCell, for robustness. Since BFR is for FR2, it is important to support BFR for SCell. NR Rel-16 will include support BFR for SCell (see RP-182067, "Revised WID: Enhancements on MIMO for NR").

An important use case for SCell is downlink-only SCells or SCells without semi-statically allocated UL resources. Since the BFR procedure includes an uplink transmission, it is important to support BFR UL transmission on another cell other than the failed SCell.

However, for SCells with both DL and UL, it should be possible to use the same SCell for the whole BFR procedure. Hence, more flexibility for the cell on which the BFR UL is transmitted is needed.

Beam failure is detected when the DL link quality, represented by the beam failure detection (BFD) RS, has deteriorated to such a level that BFR is warranted. The deterioration may be gradual, such as when the UE moves out of the coverage of a beam, or sudden, such as when radio channel blocking occurs. When the DL link quality of a cell deteriorates suddenly, the PDCCH/PDSCH error probability may increase dramatically, until the link has been recovered and a new beam pair has been established.

For URLLC, the negative impact of beam failure on reliability and latency should be minimized.

One approach could be to configure BFD thresholds such that beam failure is detected well before the beam pair actually fails. While this could work in some scenarios, such as when the link quality degrades gradually, it doesn't help much in the case of sudden deterioration. Furthermore, such sensitive threshold settings would significantly increase the rate of BFR and thereby the overhead.

Another more promising approach is to reduce the average duration of the BFR procedure and minimize the risk of an extended BFR procedure with retransmissions.

Disclosed herein are methods and systems that address the insufficiently flexible beam failure recovery (BFR) framework in NR. Several enhancements are disclosed to support improved efficiency and robustness. The use cases BFR for DL-only SCell and BFR for URLLC are addressed for the case of a multi-carrier capable UE.

The solutions are based on a more flexible use of bandwidth parts (BWP) and cells for the various transmissions within the BFR procedure, in particular the UL beam failure recovery request (BFRQ) and the DL beam failure recovery response (BFRR). The proposed framework allows these transmission to occur in BWPs with different Id, as well as on different cells. Example benefits include: support for BFR on DL-only SCells by allowing the BFR UL transmissions on another cell with UL, support for sequential/parallel multi-cell BFRQ for improved BFR reliability and latency performance, and support for less UE-initiated BWP switching for BFR, potentially avoiding resulting packet losses.

In the context of a beam failure recovery procedure in a UE, the failed cell is the cell on which the UE has detected beam failure, which has not subsequently been successfully recovered by a completed beam failure recovery procedure. In the context of a beam failure recovery procedure in a UE, a non-failed cell is a cell that is not the failed cell.

However, in the case of multiple simultaneous BFR procedures in a UE, with different failed cells, what is a failed cell in the perspective of one procedure may be a non-failed cell in the perspective of another procedure. For example, consider the case that a UE has a Primary Cell (PCell) and a Primary SCG Cell (PSCell), both configured with Beam Failure Recovery (BFR). If beam failure is detected in both cells at roughly the same time, there may be separate beam failure recovery procedures for each cell. From the perspective of the PCell BFR procedure, the PCell is the failed cell and the other cells (e.g., the PSCell) are the non-failed cells. From the perspective of the PSCell BFR procedure, the PSCell is the failed cell and the other cells (e.g., the PCell) are the non-failed cells.

Various BFR mechanisms are disclosed herein, in particular for Beam Failure Recovery Request (BFRQ) Transmission. In general, the mechanisms can be considered for both BFRQ transmission on the failed cell and/or on one or more non-failed cells. BFRQ transmission on a non-failed SCell or SpCell in the cell group of the failed cell, and/or an SCell or the SpCell in another cell group than the one to which the failed cell belongs is considered. Cell group as used herein may refer to Master Cell group (MCG)/Secondary Cell Group (SCG), timing advance group (TAG), PUCCH cell group or another configurable group of cells.

An example method discussed herein may comprise performing a beam failure detection operation on a first cell; performing a new beam identification operation on the first cell; selecting, based on detecting a beam failure on the first cell, an active uplink bandwidth part of the second cell and an active downlink bandwidth part of the second cell; transmitting a beam failure recovery request on the active uplink bandwidth part of the second cell; and receiving a beam failure recovery response on the active downlink bandwidth part of the second cell.

The method may further comprise determining, based on the beam failure recovery response, whether to retransmit the beam failure recovery request on the active uplink bandwidth part of the second cell. The method may further comprise transmitting a beam failure recovery request on an uplink bandwidth part of the first cell; and receiving a beam failure recovery response on a downlink bandwidth part of the first cell. The beam failure recovery request may comprise at least one of an indication of a serving cell index of the first cell or an indication that no candidate reference signal was identified. The beam failure recovery request may comprise a medium access control (MAC) control element (CE) in a physical uplink shared channel (PUSCH). The first cell may comprise one or more of a primary cell, a primary secondary cell group cell, or a secondary cell. The beam failure recovery request may comprise one or more of an index associated with a configured candidate reference signal on the first cell; a synchronization signal/physical broadcast channel index associated with the first cell; and an index associated with a non-zero power channel state information reference signal.

Consider the BFR procedure of failed cell A. BFRQ transmission on a non-failed cell B (from the perspective of the BFR procedure of cell A) includes two cases, which are both considered in various examples herein:

Cell B itself is failed, or
Cell B itself is not failed.

Before the recovery, the UE detects beam failure (beam failure detection, BFD). The UE may in some cases also perform new beam identification (NBI). In some cases, the UE may choose to omit completing NBI before proceeding to beam failure recovery. The reasons may be that the UE has not been configured with candidate RS, the qualities of the measured candidate RS (of subset thereof) are below corresponding thresholds, and/or the UE wants to save time, power, etc., before proceeding with BFR.

Note that also CBRA may require NBI since the UE selects an SSB (new beam) to be used during the CBRA and beyond. The examples disclosed herein are applicable for all cases of NBI, such as NBI completed before BFR (e.g., all candidate RS measured and evaluated), NBI partly completed before BFR (e.g., some candidate RS measured and evaluated), and no NBI performed before BFR (e.g., no candidate RS measured and evaluated). Furthermore, a UE may use any order of measurement and evaluation of BFD-RS and candidate RS. After a BFD event and before initiating the recovery (e.g., by PRACH/PUCCH/PUSCH transmission), the UE may choose to perform no additional candidate RS measurement, some (partial) candidate RS measurement or full candidate RS measurement.

CFRA/CBRA Based BFR

For CFRA-based BFR, it is clear that the PRACH is the Beam Failure Recovery ReQuest (BFRQ) and the subsequent PDCCH is the BFRR. However, for CBRA-based BFR, BFRQ and BFRR are not clearly defined. There could be multiple interpretations, such as:

Msg1 is the BFRQ,
Msg3 is the BFRQ,
Msg1+Msg3 is the BFRQ,
Msg2 is the BFRR,
Msg4 PDCCH is the BFRR, or
Msg2+Msg4 PDCCH is the BFRR.

BFRQ retransmission (in CBRA-based BFR) can be either Msg1 (PRACH) retransmission or Msg3 (PUSCH) retransmission. Hence, an absent BFRR could be either an absent Msg2 or an absent Msg4 (PDCCH). The BFRR is successfully received after successful Msg4 PDCCH reception with the right C-RNTI. In this sense, it may be more appropriate consider (Msg1+Msg3) as BFRQ and (Msg2+Msg4 PDCCH) as BFRR.

CFRA/CBRA Based BFR—BFRQ on Failed Cell

In some cases, the BFR for SpCell uses a combination of CFRA and CBRA, with the whole procedure being contained in the same SpCell. For an UL BWP, a set of candidate RS can be configured and CFRA resources can be associated with each configured candidate RS. In some situations, the UE falls back to using CBRA on the initial UL/DL BWPs.

The CFRA/CBRA can be configured on an SCell, similarly as for an SpCell. The CBRA resources could be configured for instance in the initial/default/first active UL BWP or another configured BWP. The CFRA resources could be configured for instance in time-frequency resources also used for CBRA or separate time-frequency resources, such as in another UL BWP.

CFRA/CBRA Based BFR—BFRQ on non-Failed Cell

The UE may transmit BFRQ on one or more non-failed cell(s). In some cases, CFRA-based BFRQ is configured and is transmitted on the failed cell, while CBRA-based BFRQ is configured and is transmitted on a non-failed cell. In some cases, CFRA-based BFRQ is configured and transmitted on a non-failed cell, while CBRA-based BFRQ is configured and transmitted on the same or another non-failed cell. The CBRA-based BFRQ may be a fall back mechanism to CFRA-based BFRQ. Some examples include:

CFRA-based BFRQ is used on the failed SCell while CBRA-based BFRQ is used on the non-failed SpCell (in the cell group of the failed SCell);

CFRA-based BFRQ is used on the failed SCell while CBRA-based BFRQ is used on another non-failed SCell;

CFRA-based BFRQ is used on a non-failed SCell in the cell group of the failed SCell while CBRA-based BFRQ is used on the same non-failed SCell; and CFRA-based BFRQ is used on a non-failed SCell in the cell group of the failed SCell while CBRA-based BFRQ is used on the SpCell.

In CFRA-based BFR, a dedicated PRACH resource/preamble configuration is given per candidate RS. If these PRACH resources/preambles are non-overlapping for different candidate RS, the gNB can determine the candidate RS that the UE has selected based on the PRACH resource/preamble that has been detected. It is also generally assumed that the CFRA resources/preambles of different UEs don't overlap. The BFRQ of multiple cells (e.g., all SCells in FR2) may be configured to use CFRA on the same non-failed cell (e.g., the SpCell). In this case, separate PRACH resources/preambles for the different cells may be needed, so that the gNB can determine which SCell that has failed based on the PRACH resource/preamble that was detected on the non-failed cell. For example, if a UE is configured with 16 candidate RS on 16 separate SCell, 16*16=256 separate dedicated PRACH resources/preambles may be needed for the single UE.

In CBRA-based BFRQ, the PRACH resources may be more efficiently used, since many UEs can share the same PRACH resources/preambles, assuming that BFD events are sparse compared to the PRACH resource density. However, the detected PRACH resource/preamble may not in itself indicate to the gNB that the UE is performing BFR. This can be resolved by the UE including the C-RNTI MAC CE in Msg3, whereby the gNB can deduce that beam failure has been detected. Furthermore, the SSB associated with the detected PRACH resource/preamble may be used as the new beam, which is fine when the CBRA was performed on the failed cell. However, in the case that CBRA is performed on a non-failed cell (e.g., on an SpCell in FR1), there may be no or little relation between the SSBs/beams used on the non-failed cell and the RS/beams on the failed cell (e.g., an SCell in FR2). Consequently, one or more of the following may be indicated in the BFRQ (e.g., in a Msg3 MAC CE):

An index among the configured candidate RS on the failed cell, such as an indication of new beam(s), An SSB index on the failed cell, such as indication of new beam(s), and/or An index of a non-zero power CSI-RS (e.g., NZP-CSI-RS-ResourceId), such as indication of new beam(s).

It may be necessary to indicate to the gNB which cell that has failed, as well as additional information, such as information about the reason CBRA-based BFRQ has been used. Hence, the BFRQ (e.g., Msg3 MAC CE) may include one or more of the following:

Cell index of the failed cell (e.g., ServCellIndex) or group of cells,

An indication that CBRA-based BFRQ has been initiated since quality of no candidate RS was above a corresponding threshold, An indication that CBRA-based BFRQ has been initiated since BFR initiated on another cell, such as the failed cell or a non-failed cell, was not successfully completed, and/or An indication that BFR, including the BFRQ transmission, has been initiated also on another cell.

CFRA-Only—BFRQ on Failed Cell

BFR based on CFRA on the failed cell may be similar to the CFRA based BFR procedures discussed herein but without the CBRA fallback.

CFRA-resources may be configured on a subset of the UL BWPs in a cell, such as on one UL BWP or on multiple UL BWPs. A UE that detects beam failure on a cell may switch to an UL BWP in the cell with configured CFRA-resources only if the active UL BWP does not have configured CFRA-resources for BFR.

A UE that detects beam failure on a cell may switch to an UL BWP in the cell with configured CFRA-resources even if the active UL BWP has configured CFRA-resources for BFR. The gNB may not know in advance that the UE switched UL BWP for BFR. Therefore, if the NW configures CFRA on multiple UL BWPs and the UE may autonomously select which one to use, the gNB may need to perform PRACH detection on the multiple CFRA resources on the multiple UL BWPs. This could be useful for instance for CFRA load/resource balancing across UL BWPs. A UE could be configured with CFRA resources associated with some candidate RS on one UL BWP, but PRACH resources associated with some other candidate RS on another UL BWP (e.g., due to lack of free CFRA resources/preambles on the first BWP).

In an example in which multiple UL BWPs have CFRA-resources configured for BFRQ, the UE may select which UL BWP to switch to based on, for example, one or more of the following factors:

Which UL BWP that has CFRA resources/preamble associated with a selected candidate RS (different UL BWPs in a cell may be configured with sets of dedicated PRACH resources/preambles associated with different sets of candidate RS), and/or Which UL BWP that would offer better expected performance, for example latency until PRACH transmission.

CFRA-Only—BFRQ on Non-Failed Cell

CFRA-only based BFRQ transmission on a non-Failed Cell may be similar to the CFRA based BFR procedures but without the CBRA fallback.

CBRA-Only—BFRQ on Failed Cell

CBRA-only based BRFQ transmission on a non-failed cell may be similar to the CBRA based BFR procedures but without the CFRA option.

CBRA-Only—BFRQ on Non-Failed Cell

CBRA-only based BRFQ transmission on a non-failed cell may be similar to the CBRA based BFR procedures but without the CFRA option.

PUCCI/UCI Based—BFRQ on Failed Cell

In PUCCH/UCI based BFRQ, the UE may transmit the BFRQ on PUCCH or as uplink control information (UCI) in the PUSCH if they are configured or granted.

In the case of BFRQ transmission on PUCCH, the relevant BFRQ-related information can be embedded either as bit(s) in the UCI payload and/or in the UE's selection of PUCCH time/frequency/code resource. For example, a UE that has been assigned with multiple resources for PUCCH may select PUCCH resource based on a selected candidate RS. This is similar to the association between candidate RS and resource/preamble for BFR based on CFRA and/or CBRA. PUCCH-based BFRQ is typically more resource efficient than CFRA-based BFRQ, but still requires semi-statically allocated PUCCH resources.

In some situations, the UCI may instead be multiplexed within (or piggybacked on) a PUSCH transmission.

PUCCI/UCI Based—BFRQ on Non-Failed Cell

There may be minor differences between PUCCH/UCI-based BFRQ on a non-failed cell and on the failed cell. For instance, a cell ID/index of the failed cell may need to be included as well as potentially other information. For example, one or more of the following could be indicated in the PUCCH/UCI-based BFRQ:

An index among the configured candidate RS on the failed cell, such as indication of new beam(s), An SSB index on the failed cell, such as indication of new beam(s), and/or An index of a non-zero power CSI-RS (e.g., NZP-CSI-RS-ResourceId), such as indication of new beam(s).

It may be necessary to indicate to the gNB which cell that has failed, as well as additional information (e.g., about the reason PUCCH/UCI-based BFRQ has been used). Hence, the BFRQ may include one or more of the following:

A cell index of the failed cell (e.g., ServCellIndex) or group of cells,

An indication that PUCCH/UCI-based BFRQ has been initiated since quality of no candidate RS was above a corresponding threshold, An indication that PUCCH/UCI-based BFRQ has been initiated since BFR initiated on another cell (e.g., the failed cell or a non-failed cell) was not successfully completed, and/or An indication that BFR, including BFRQ transmission, has been initiated also on another cell.

Mac-CE in PUSCH Based—BFRQ on Failed Cell

The BFRQ and related information may be included as a MAC control element in a PUSCH transmission.

An advantage with the MAC CE based mechanism is that more BFRQ related information bits can be transmitted more efficiently, compared to the PUCCH and CFRA/CBRA based approaches. Furthermore, the PUSCH may be dynamically scheduled which keeps down the amount of semi-statically reserved UL resources for BFR. However, semi-statically resources for scheduling request (SR) on PUCCH may be required, but such resources may be needed anyway. For example, BFR might not require additional semi-statically allocated UL resources that are not already required. In an example that the PUSCH that carries the MAC CE is scheduled following an SR on PUCCH, the BFRQ may comprise both the PUCCH transmission and the subsequent PUSCH transmission. In other cases, such as when the PUSCH carrying the MAC CE is not scheduled following an SR on PUCCH triggered by beam failure, the BFRQ may comprise only the PUSCH carrying the MAC CE.

A disadvantage with the MAC CE based mechanism could be that it may be slower than a CFRA or PUCCH based mechanism, for which the BFRQ is conveyed immediately upon CFRA/PUCCH transmission and reception. The MAC CE based mechanism, on the other hand, may require first an SR transmission, followed by a scheduling grant in PDCCH and then the PUSCH transmission containing the BFRQ. However, many UEs may perform new beam identification at least partly after the beam failure detection, which would involve additional BFR latency. Since the candidate beam RS may be periodically transmitted, such UEs may transmit the SR before the finalization of the new beam identification such that the delay between new beam identification and MAC CE transmission could be kept small. Furthermore, for a UE with ongoing PUSCH transmission and grants (enabled by buffer status report instead of SR), there is no need to transmit SR.

Another potential disadvantage of using the MAC CE-based BFR mechanism on the failed cell is that it may involve the PUSCH scheduling grant in PDCCH being transmitted on a failed DL beam pair, depending on the RS configured for BFD. This may be a motivation to use a non-failed cell for BFRQ in case the MAC CE based mechanism is used.

Mac-CE in PUSCH Based—BFRQ on Non-Failed Cell

There may be minor differences between MAC CE-based BFRQ on a non-failed cell and on the failed cell. For instance, a cell ID/index of the failed cell may need to be included as well as potentially other information. For example, one or more of the following could be indicated in the MAC CE-based BFRQ:

An index among the configured candidate RS on the failed cell, e.g., as indication of new beam(s), An SSB index on the failed cell (e.g., as indication of new beam(s)), and/or An index of a non-zero power CSI-RS (e.g., NZP-CSI-RS-ResourceId), such as indication of new beam(s).

It may be necessary to indicate to the gNB which cell that has failed, as well as additional information (e.g., about the reason MAC CE-based BFRQ has been used). Hence, the BFRQ may include one or more of the following:

A cell index of the failed cell (e.g., ServCellIndex) or group of cells,

An indication that MAC CE-based BFRQ has been initiated since quality of no candidate RS was above a corresponding threshold, An indication that MAC CE-based BFRQ has been initiated since BFR initiated on another cell (e.g., the failed cell or a non-failed cell) was not successfully completed, and/or An indication that BFR, including BFRQ transmission, has been initiated also on another cell.

A new logical channel ID may be specified for BFRQ MAC CE. The BFRQ MAC CE priority may be higher than the priority of Configured Grant Confirmation MAC CE or other MAC CEs of lower priority than the Configure Grant Confirmation MAC CE. The corresponding update to the logical channel prioritization text may be as follows:

Logical channels shall be prioritized in accordance with the following order (highest priority listed first):

C-RNTI MAC CE or data from UL-CCCH;

MAC CE for BFRQ;

Configured Grant Confirmation MAC CE;

MAC CE for BSR, with exception of BSR included for padding;

Single Entry PHR MAC CE or Multiple Entry PHR MAC CE;

Data from any Logical Channel, except data from UL-CCCH;

MAC CE for Recommended bit rate query; and

MAC CE for BSR included for padding.

The BFRQ MAC CE priority may be higher than the priority of C-RNTI MAC or data from UL-CCCH MAC CE or other MAC CEs of lower priority than C-RNTI MAC or data from UL-CCCH MAC CE. The corresponding update to the logical channel prioritization text may be as follows:

Logical channels shall be prioritized in accordance with the following order (highest priority listed first):

MAC CE for BFRQ

C-RNTI MAC CE or data from UL-CCCH;

Configured Grant Confirmation MAC CE;

MAC CE for BSR, with exception of BSR included for padding;

Single Entry PHR MAC CE or Multiple Entry PHR MAC CE;

Data from any Logical Channel, except data from UL-CCCH;

MAC CE for Recommended bit rate query; and

MAC CE for BSR included for padding.

UE Procedures for Enhanced BFR

The BFR procedure is described at various levels of abstraction. In most UE procedure examples, BFRQ transmission on a cell/BWP is not described in detail. This should be understood such that any BFRQ mechanism could be used, in particular the various BFRQ examples described above. Furthermore, examples in which one cell/BWP uses one BFRQ mechanism and another cell/BWP uses another BFRQ mechanism are also considered, and in some cases explicitly mentioned.

Figure 4:
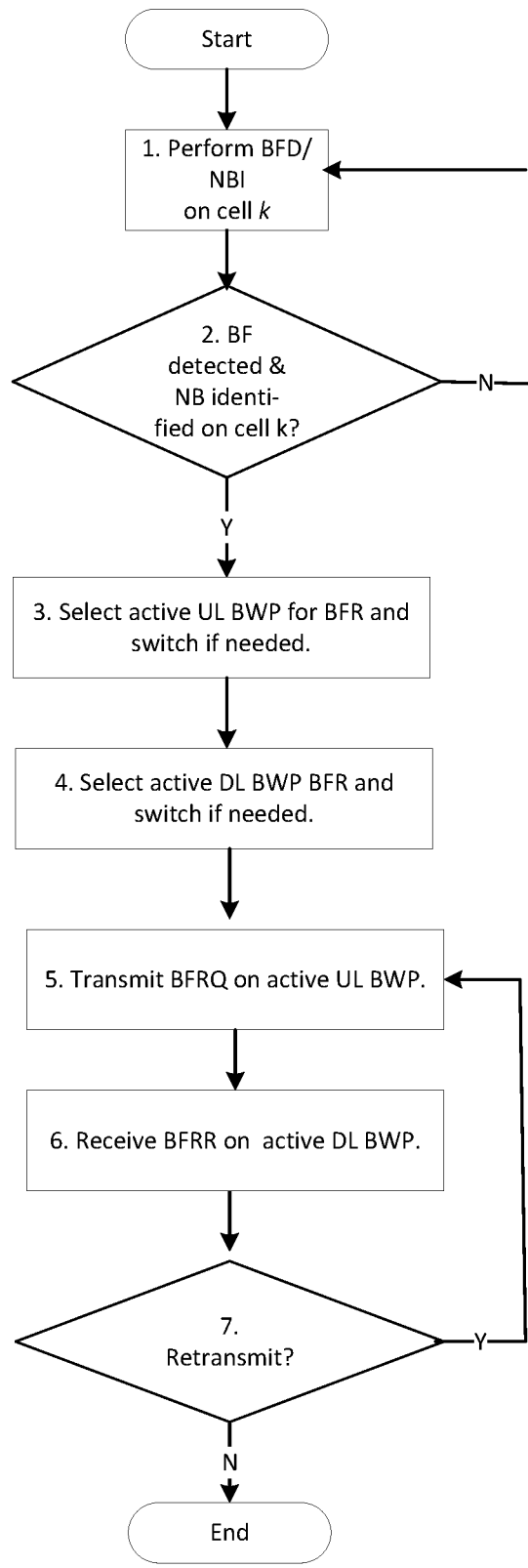
FIG. 4 shows a flowchart of an example UE procedure for performing BFR with possible switching of UL BWP and DL BWP.

Described below is a UE procedure that may be used for BFR on the failed cell or on a non-failed cell (to recover beam failure on the failed cell). The UE procedure may be partly or fully performed in multiple cells, in sequence and/or partly or fully in parallel. A benefit of the procedures described here is that fewer semi-static BFRQ resources may need to be configured in a cell. Furthermore, UE-initiated BWP switching may be avoided in some cases, thereby reducing the risk for data transmission block errors during the BFR procedure. An enhanced BFR procedure is shown in FIG. 4.

At steps 1 and 2, the UE performs beam failure detection (BFD) and new beam identification (NBI) on cell k. The cell k may be a PCell, PSCell or SCell. BFD may be based on RS (e.g., CSI-RS and/or SSB) explicitly configured by the gNB, or implicitly given by a subset of RS that are QCL with the CORESETs of the active DL BWP. For explicitly configured BFD RS, they may be configured per DL BWP (e.g., in the RadioLinkMonitoringConfig IE) or per serving cell. In some cases, if BFD RS are not explicitly configured, the UE may use an implicitly given RS for BFD. NBI may be based on RS (e.g., CSI-RS and/or SSB), such as explicitly configured candidate RS or given implicitly. Explicitly configured candidate RS may be configured per DL BWP, per UL BWP or per serving cell. If candidate RS are not configured or if the quality of candidate RS(s) are below corresponding thresholds, the UE may use implicitly given RS for NBI (e.g., a subset of RS(s) used for beam management) or default RS (e.g., the actually transmitted SSBs). A UE may select an RS from a set of candidate RS as its new beam, as long as its estimated quality (e.g., RSRP, SINR, hypothetical BLER, etc.) is above a threshold.

At step 3, the beam failure has been detected and a new beam has been identified. The UE may switch to an UL BWP $j_1$ for BFRQ from the active UL BWP $j_0$ (at the time of BFD and NBI). In some examples, $j_1 \neq j_0$ and in some examples $j_1 \neq 0$. The UL BWP switching may be based on one or more of the following factors (but not limited to):

BFR (resources etc.) has not been configured for UL BWP $j_0$ (e.g., IE BeamFailureRecoveryConfig), UE selects a candidate RS with associated BFRQ resource in UL BWP $j_1$, but not in UL BWP $j_0$, UE selects a candidate RS with associated BFRQ resource in UL BWP $j_1$ closer in time than the associated BFRQ resource in UL BWP $j_0$, and/or No candidate RS configured for UL BWP $j_0$ has RSRP above a corresponding threshold.

If the UE doesn't switch UL BWP for BFR, $j_1=j_0$. The selected UL BWP $j_1$ is configured for BFR, for example to using one of the BFR mechanisms discussed above.

At step 4, the UE may also switch to a DL BWP $i_1$ for BFRR from the active DL BWP $i_0$ (at the time of BFD and NBI). In some examples, $i_1..i_0$ and in some examples $i_1 \neq 0$. A UE may switch to DL BWP $i_1$ only if DL BWP $i_0$ is not configured with a recovery search space. In some cases, when multiple DL BWPs are configured with a recovery response search space, but not the active DL BWP $i_0$, then the UE may switch to the DL BWP with configure recovery search space with the lowest BWP Id. The UE may switch DL BWP to the same Id as has been selected for the UL BFRR.

At step 5, the UE transmits BFRQ on the selected UL BWP.

At step 6, the UE monitors the selected DL BWP for its BFRR.

At step 7, the UE evaluates if BFRQ should be retransmitted, such as if BFRR was not received correctly and if a maximum number of retransmissions hasn't been reached.

Note that steps 3-7, or a subset thereof, may be performed on the failed cell k and/or on a non-failed cell m. For example, the UL-related steps 3 and 5 could be performed on a non-failed cell m.

The illustrated above can be beneficial for a UE on a cell (e.g., SCell) in which there is no BFRQ resources (e.g., for CBRA) on BWP 0, but there are BFRQ resources defined on the UL BWP $j_1$, which is currently not active. The UE may switch to BWP $j_1$ upon BFD/NBI, for example based on the factors listed in above. Without the enhancement, BFR would not be supported on the cell.

Note that the details of step 5 and step 6 depend on the actual BFR mechanism, such as based on CFRA, CBRA, PUCCH, MAC CE, etc. For example, for a mechanism based on random access, step 5 and 6 may involve PRACH retransmission(s) following the expiration of a monitored RAR windows. In other words, there may be iterations of BFRQ transmission (step 5) and BFRQ monitoring before successful BFRR reception. In another example with BFRR being included as a MAC CE in PUSCH, there may be PUSCH retransmissions. Step 7 is meant to capture such BFRQ retransmissions.

Note that, for simplicity, the figures mostly do not explicitly depict the partial or complete failure of the BFR procedure (e.g., due to the maximum number of retransmissions or the expiry of a timer). Nevertheless, such partial or complete failure is part of the procedures, with the details depending on the actual BFR mechanism. Hence, in various procedures, such as illustrated in the FIG. 4-FIG. 17, the "Retransmit?" selector includes the possibility to not retransmit (path "N") even though the BFRQ transmission and/or BFRR reception was not successful. In such cases, the beam failure recovery procedure may be considered to be unsuccessful.

UE Procedures for Enhanced BFR with BFRQ on Non-Failed Cell

Figure 5:
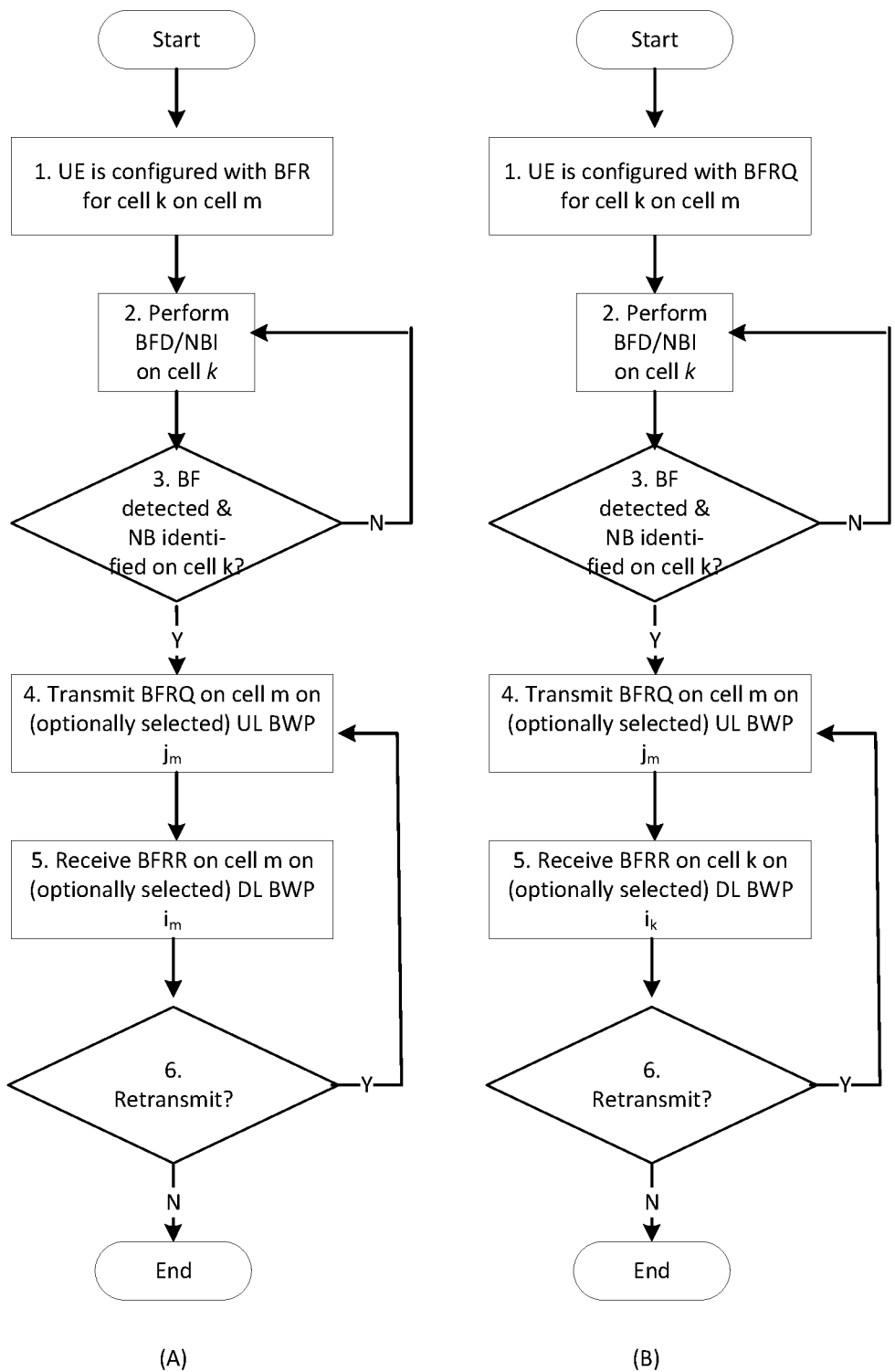
FIG. 5 shows a flowchart of two example UE procedures for performing BFR on a cell m after BFD/NBI on cell k.

FIG. 5 illustrates two example procedures for BFR, at least partly, on a cell m after beam failure is detected on cell k, with k≠m. First, the UE is configured with beam failure recovery for cell k, and at least partly, on cell m. This means that after beam failure is detected on cell k, the UE performs, at least parts of, BFR on cell m, where m is different from k. Partly performing BFR on a cell m means that one or more of the steps in the BFR procedure is performed on cell m. The other steps are performed on another cell, such as cell k or another SCell. The procedure is useful for example for BFR on a DL-only SCell, since BFR UL transmission are not needed.

In general for the multi-cell procedures described herein, cell k can be PCell, PSCell or SCell (which may or may not be a PUCCH-SCell) and cell m can be PCell, PSCell or SCell (which may or may not be a PUCCH-SCell). Note that although the examples here use two cells for simplicity (the failed cell k and one non-failed cell m), the procedures readily generalize to the case with multiple other cells ($m_1$, $m_2$, . . . ) beside the failed cell k, and include the special case that k=m.

The cell ID or serving cell index of cell m may not be explicitly configured. Instead, it can be the serving cell with lowest cell index, lowest carrier frequency that has BFR configured. In some cases, cell m can only be the SpCell in the cell group of cell k. Cell m may be a PUCCH-SCell in the cell group of cell k.

In both example procedure (A) and (B) shown in FIG. 5, the UE transmits BFRQ on cell m, on the UL BWP $j_m$. The UL BWP $j_m$ may for instance be configured in the first step (after Start), or it may be the active UL BWP in cell m at the time of BFD/NBI, the initial active UL BWP, or an UL BWP selected by the UE.

In example procedure (A) of FIG. 5, where BFRR is received on a non-failed cell m, the UE monitors a search space in DL BWP $i_m$ on cell m for the BFRR. The DL BWP $i_m$ can for example have the same BWP Id $j_m$ as the UL BWP used for BFRQ in cell m, i.e. $i_m=j_m$ (e.g., in unpaired spectrum), or it could be different, i.e. $i_m \neq j_m$ (e.g., in paired spectrum). It could also be the active DL BWP at the time of BFD (e.g., possibly with a different BWP Id than $j_m$) or selected by the UE.

In example procedure (B) of FIG. 5, where BFRR is received on the failed cell k, the UE monitors a search space in DL BWP $i_k$ on cell k for the BFRR. The DL BWP $i_k$ can for example be active DL BWP in cell k at the time of BFD, or another configured DL BWP, or the initial active DL BWP or another DL BWP selected by the UE.

Step 1 in procedure (A) indicates that BFR is configured on cell m, while step 1 in procedure (B) indicates that BFRQ is configured on cell m. This means that in procedure (A), both BFRQ and BFRR is performed on cell m. In procedure (B), only BFRQ is performed on cell m, while BFRR is performed on the failed cell k.

Note that steps 4 and 5 in FIG. 5 may involve BWP switching, as in FIG. 4.

Figure 6A:
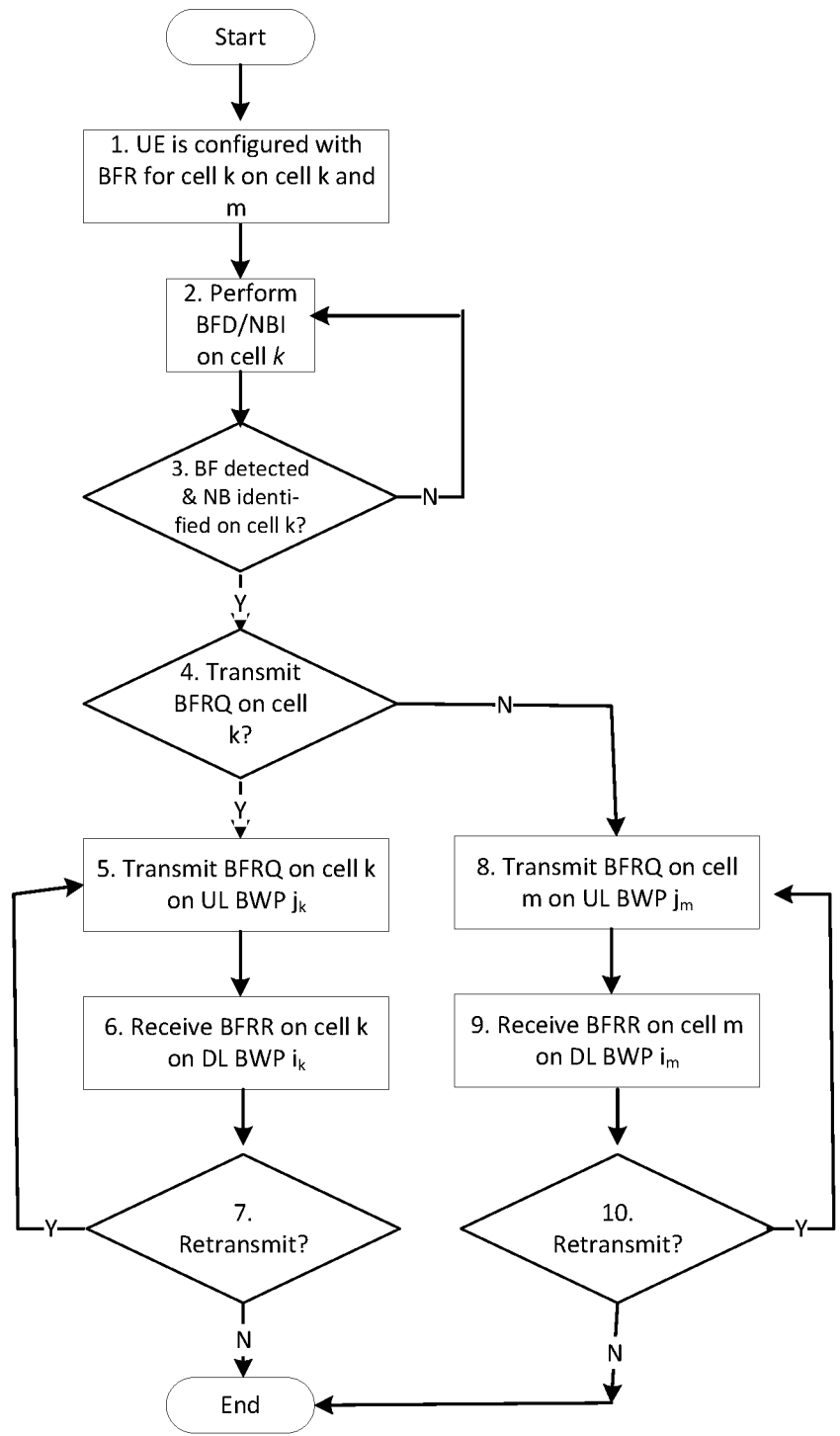
FIG. 6A shows a flowchart of an example UE procedure for performing BFR on a cell m after BFD/NBI on cell k.
Figure 6B:
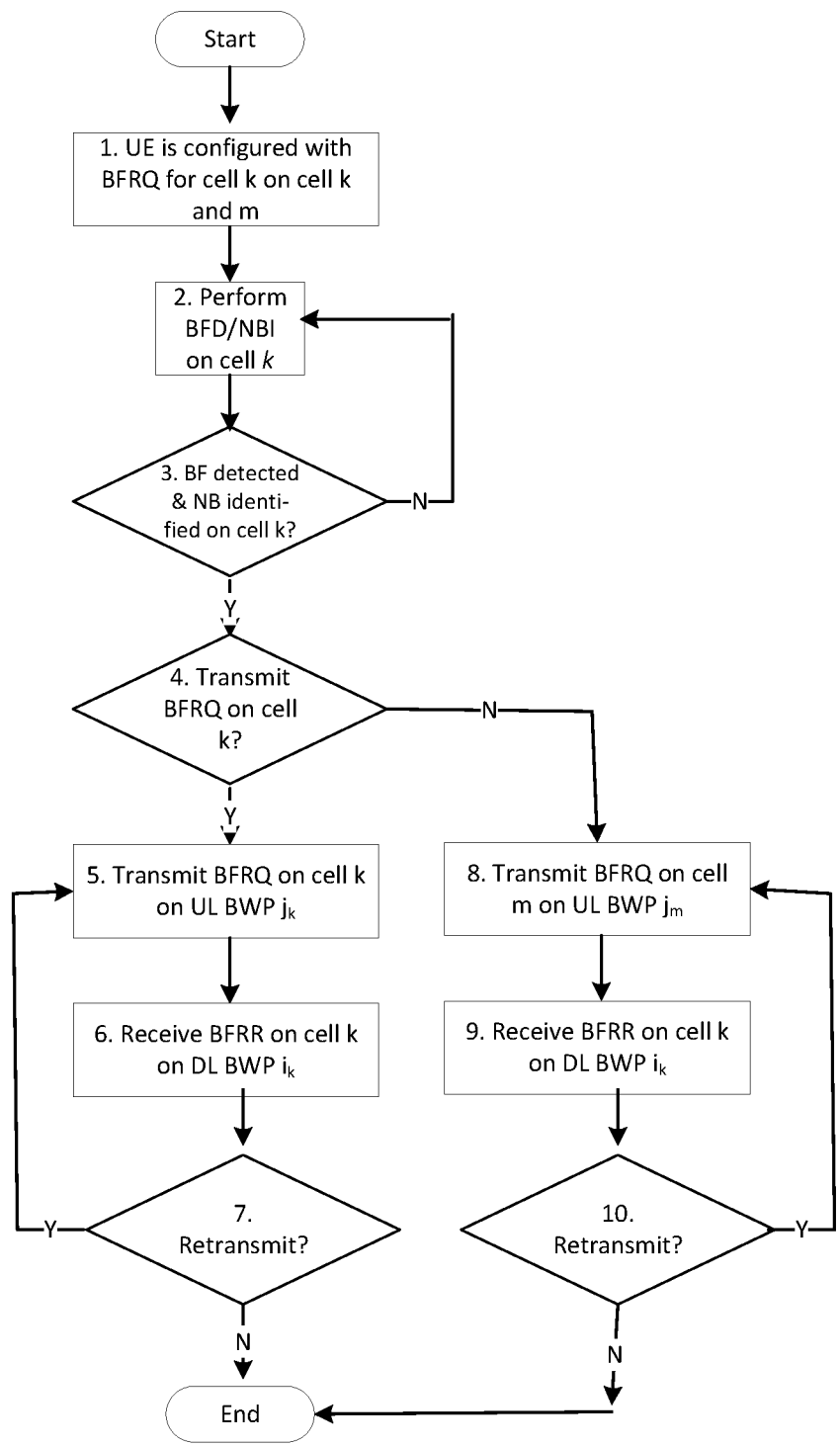
FIG. 6B shows a flowchart of another example UE procedure for performing BFR on a cell m after BFD/NBI on cell k.

FIGS. 6A and 6B shows two example procedures in which the UE is configured to perform BFR on either cell k or cell m. Criteria for UE selecting cell m instead of cell k may be for example one or more of (but not limited to):

The active UL BWP in cell k has no configured resources for BFRQ,

The quality (RSRP, RSRQ, SINR, BLER, etc.) of the candidate RS(s) configured for the active UL BWP in cell k are below corresponding threshold(s), The expected QoS (e.g., latency or reliability) associated with transmitting BFRQ on cell m is better than for cell k, The beam failure status of cell m, such as for example: cell m is also failed (e.g., the MAC entity of cell m has initiated the beam failure recovery procedure), or has an BFI_COUNTER>0 (e.g., the MAC entity of cell m has recently received beam failure instance indication(s) from lower layers but not yet declared beam failure), Which choice of cell that will disrupt ongoing data transmission less, e.g., due to UE-initiated BWP switches, Other aspects disclosed herein, and/or It is up to UE implementation to select cell m or k.

Procedures such those illustrated in FIG. 6A and 6B can be beneficial in scenarios in which the BFR mechanism used on cell k needs a fallback mechanism on cell m. An example is CFRA-based BFR configured on cell k (SCell), with CBRA fallback configured on cell m (SpCell). Another example may be a MAC CE based BFR configured on cell k (SCell), with CBRA fallback configured on cell m (SpCell).

Alternative FIG. 6A and FIG. 6B differ in similar ways as in FIG. 4. In (A), the BFRR is received on cell m if the BFRQ is transmitted on cell m. In (B), the BFRR is received on cell k, even if BFRQ is transmitted on cell m.

There are various options for the UL BWP used for BFRQ on cell k, $j_k$, such as the active UL BWP at the time of BFD, the initial active UL BWP in cell k or another configured UL BWP in cell k with configured BFRQ resources. Similarly, as discussed for FIG. 5, there are various options for the BWPs $i_k$, $i_m$ and $j_m$. The DL BWP $i_m$ can for example have the same BWP Id $j_m$ as the UL BWP used for BFRQ in cell m (e.g., $i_m=j_m$) such as in unpaired spectrum, or it could be different (e.g., $i_m \neq j_m$) such as in paired spectrum. The DL BWP $i_k$ can for example have the same BWP Id $j_k$ as the UL BWP used for BFRQ in cell m (e.g., $i_k=j_k$) such as in unpaired spectrum, or it could be different (e.g., $i_k \neq j_k$) such as in paired spectrum.

A BFRQ transmitted on cell m may carry an indication related to the criterion for selecting cell m, for example that the qualities of all candidate RS(s) on cell k were below the corresponding threshold(s).

In an example in which the UE switches active UL BWP for BFRQ transmission (e.g., $j_k$ on cell k or $j_m$ on cell m), the UE may switch back to the previous active UL BWP before the successful BFR procedure completion (e.g., prior to an upcoming UL transmission on the previous active UL BWP) for example in order to continue the DL/UL communication on the carrier without further disruption.

UE Procedure for "Multiple" BFR Configured on Failed and/or Non-Failed Cell—BFRQ on a Second Cell after N unsuccessful beam failure recovery response (BFRR) receptions (sequential version)

Figure 7:
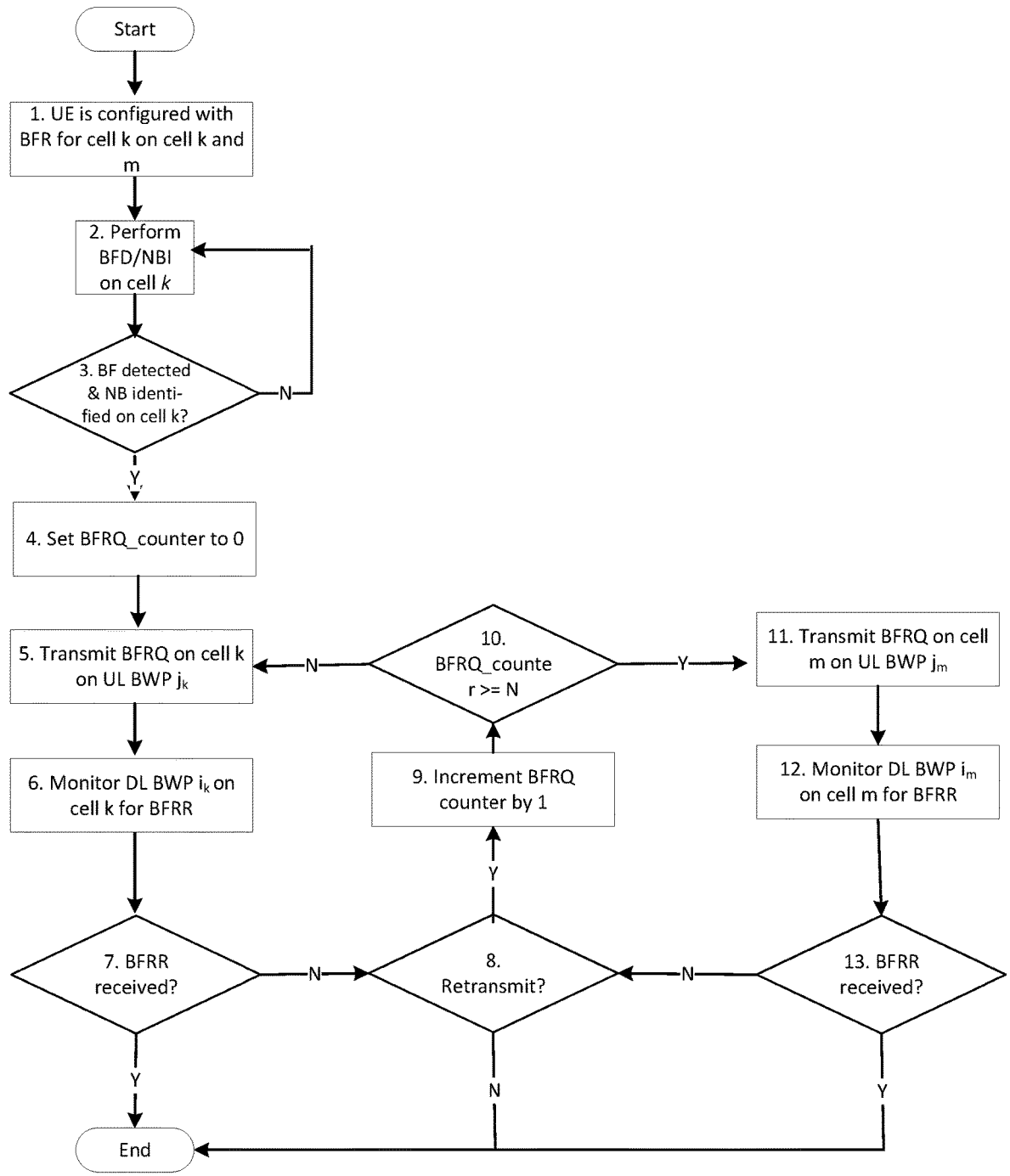
FIG. 7 shows a flowchart of an example procedure for performing sequential BFR (both BFRQ transmission and BFRR monitoring) on cell k and cell m. The UE falls back to BFR on cell m after N BFRQ transmissions on cell k.
Figure 8:
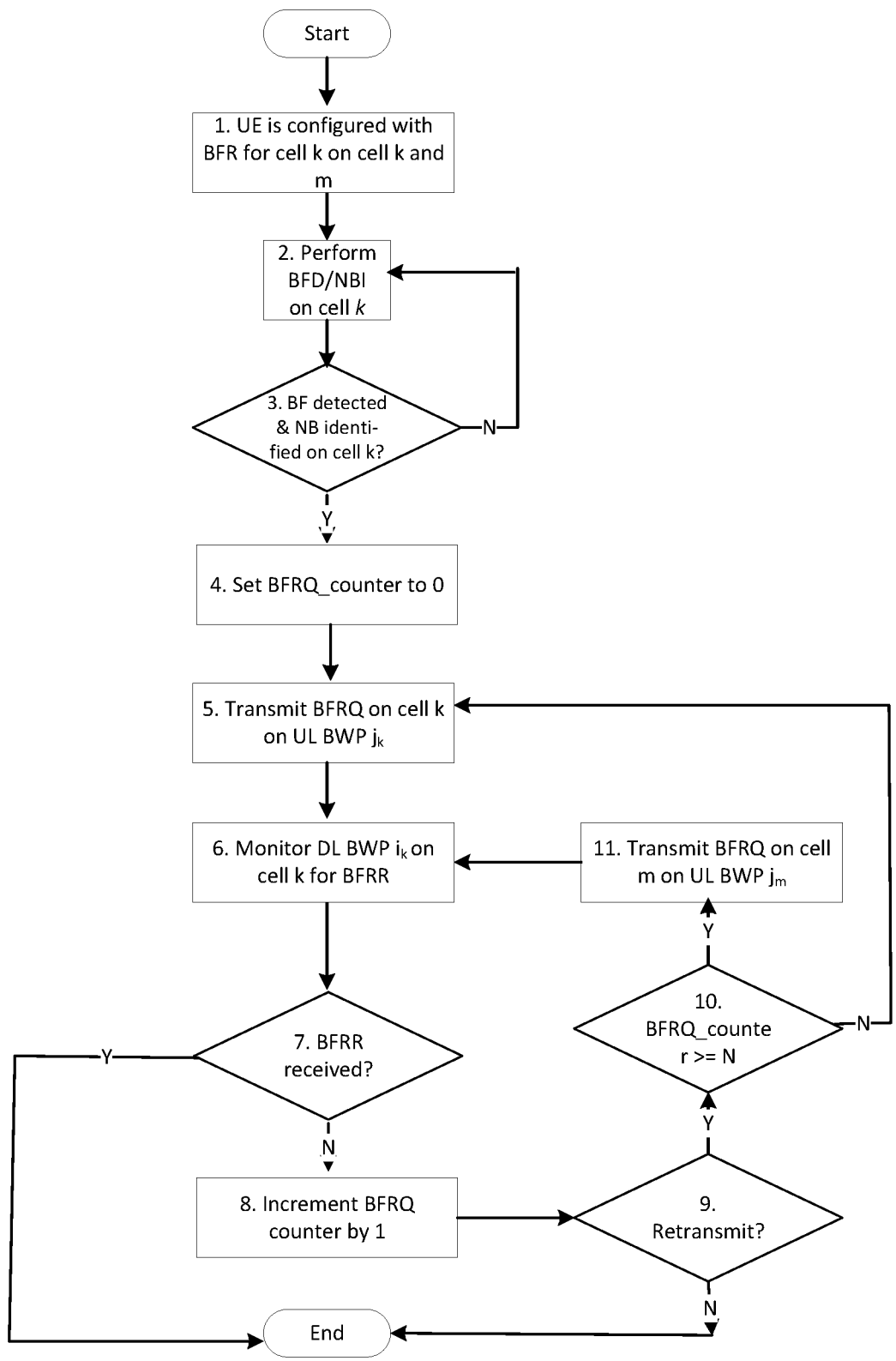
FIG. 8 shows a flowchart of an example procedure for performing sequential BFRQ on first cell k and then cell m, with BFRR monitoring on cell k. The UE falls back to BFRQ on cell m after N BFRQ transmissions on cell k.

FIG. 7 and FIG. 8 illustrate UE procedures in which the UE may switch BFRQ transmission from cell k to cell m. Such a switch may provide BFRQ fallback with transmit diversity with higher probability of fast and/or successful link recovery, for example when cell k is an SCell in FR2 that experiences a sudden radio channel blocking and cell m is the SpCell in FR1.

In particular, the UE may perform BFRQ transmission on cell m after N failed BFRQ transmissions on cell k (or equivalently N unsuccessful BFRR receptions on cell k). In FIG. 7, the UE monitors BWP $i_k$ on cell k for the BFRR. Monitoring means that the UE monitors one or more search spaces configured for the BWP for PDCCH (e.g., the recovery search space). For BFRQ transmitted on cell m, the UE monitors cell m for the response.

$N_{max} \geq N$ may be the maximum number of PRACH in the random access procedure within the BFR procedure or the maximum number of PUSCH retransmissions in the BFR procedure.

The UE may implicitly or explicitly indicate the cell k that has failed in the BFRQ on cell m. This may be important information for the gNB to successfully and quickly recover the beam failure on cell k. However, in certain example, the BFRQ on cell m does not indicate the failed cell k. Instead, it may be up to the network implementation how to recover the beam failure on cell k successfully.

In FIG. 8 on the other hand, the UE monitors cell k for BFRR. This means that the UE can expect the gNB to respond on cell k to a successfully received BFRQ on cell m. Such cross-cell BFR would in some cases require the UE to include additional information in the BFRQ, such as the ID or index of the failed cell k, ID or index of a cell group to which the failed cell k belongs, one or more candidate RS indices as new beam indication, indication if the quality of no candidate RS was above the corresponding threshold, etc.

A counter may keep track of the total number of BFRQ transmissions within the BFR procedure across all involved cells (e.g., both cell k and cell m). The total number of BFRQ transmissions may be limited. For instance, step 8 in FIG. 7 and step 9 in FIG. 8 may choose retransmission only if the total number of retransmissions is not exceeded.

UE Procedure for "Multiple" BFR Configured on Failed and/or Non-Failed Cell—BFRQ on a Second Cell after N unsuccessful beam failure recovery response (BFRR) receptions (parallel version)

Figure 9:
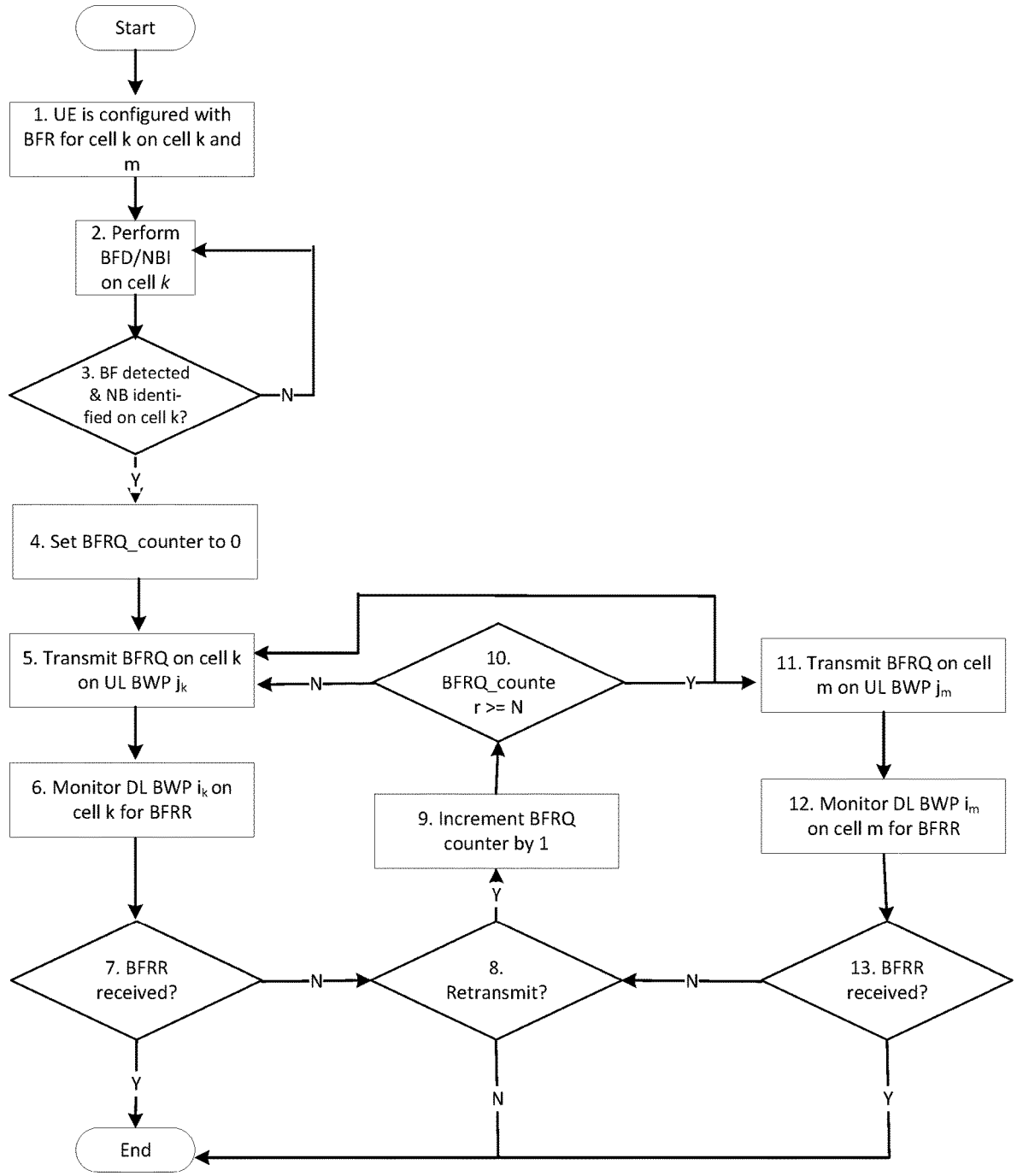
FIG. 9 shows a flowchart of an example procedure for performing parallel BFR (both BFRQ transmission and BFRR monitoring) on cell k and cell m.
Figure 10:
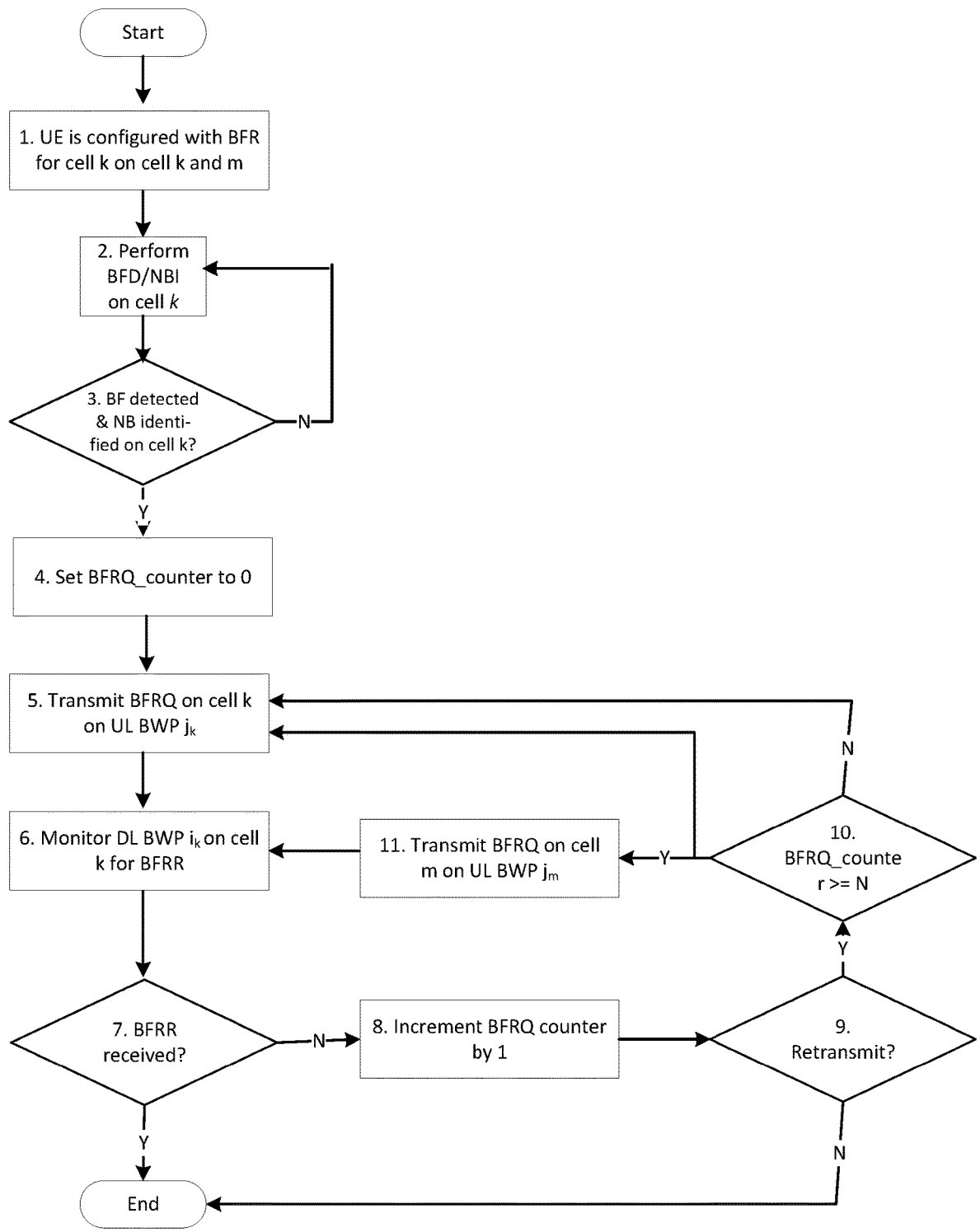
FIG. 10 shows a flowchart of an example procedure for performing parallel BFR (parallel BFRQ transmission but not BFRR monitoring) on cell k and cell m.
Figure 11:
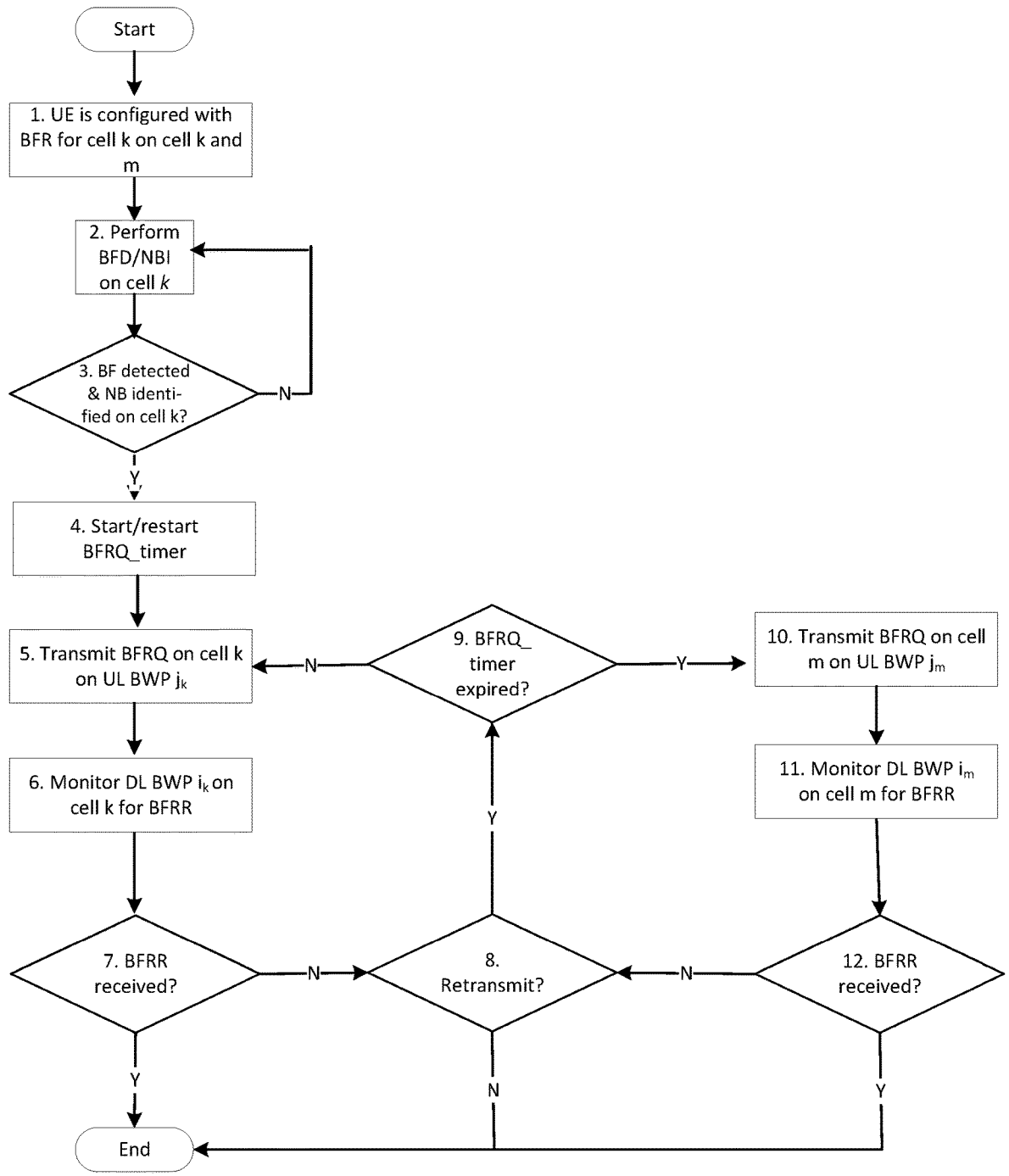
FIG. 11 shows a flowchart of an example procedure for performing sequential BFR (both BFRQ transmission and BFRR monitoring) on cell k and cell m. The UE falls back to BFR on cell m after timer expiry.
Figure 12:
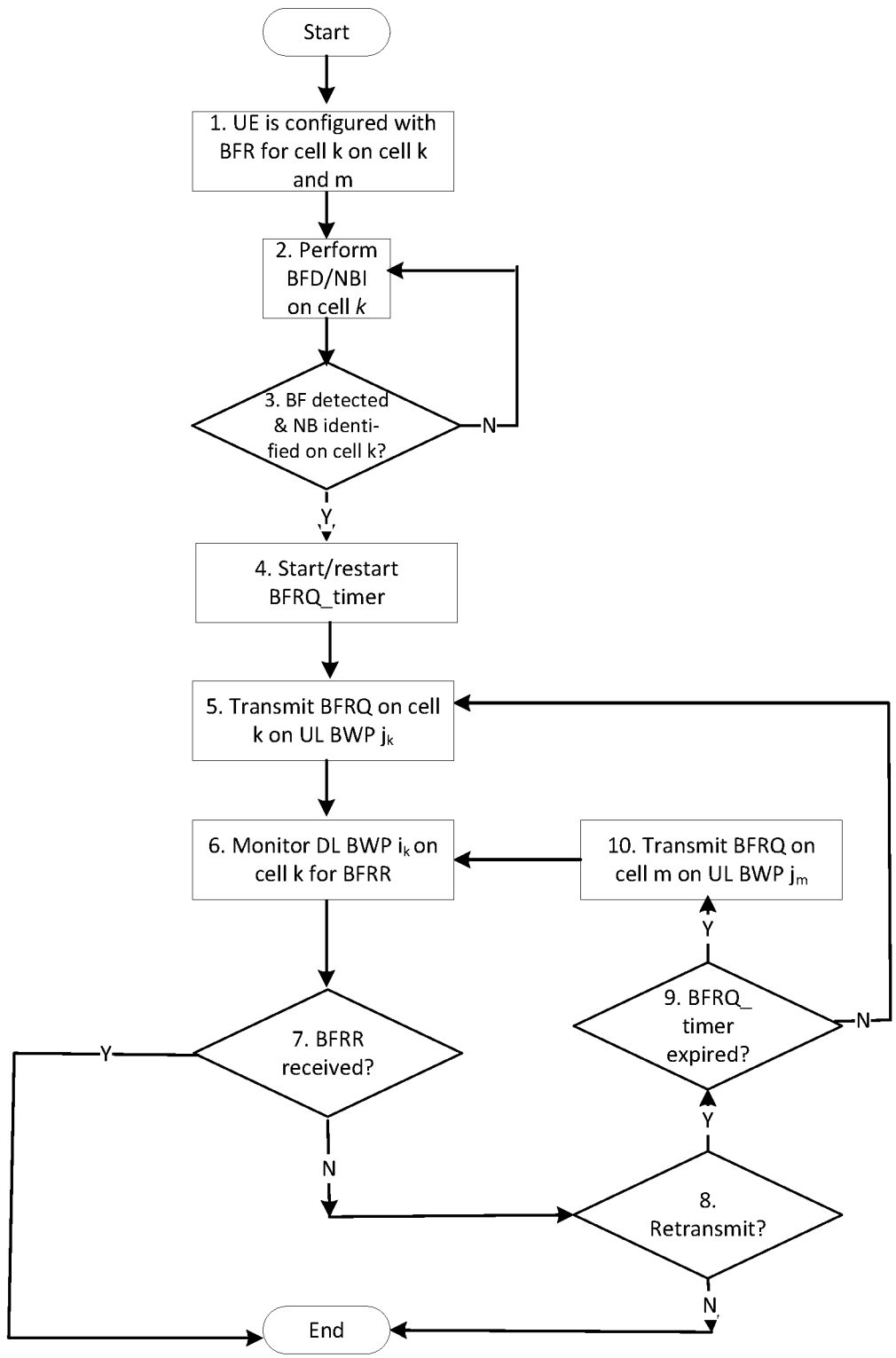
FIG. 12 shows a flowchart of an example procedure for performing sequential BFRQ on first cell k and then cell m, with BFRR monitoring on cell k. The UE falls back to BFRQ on cell m after timer expiry.
Figure 13:
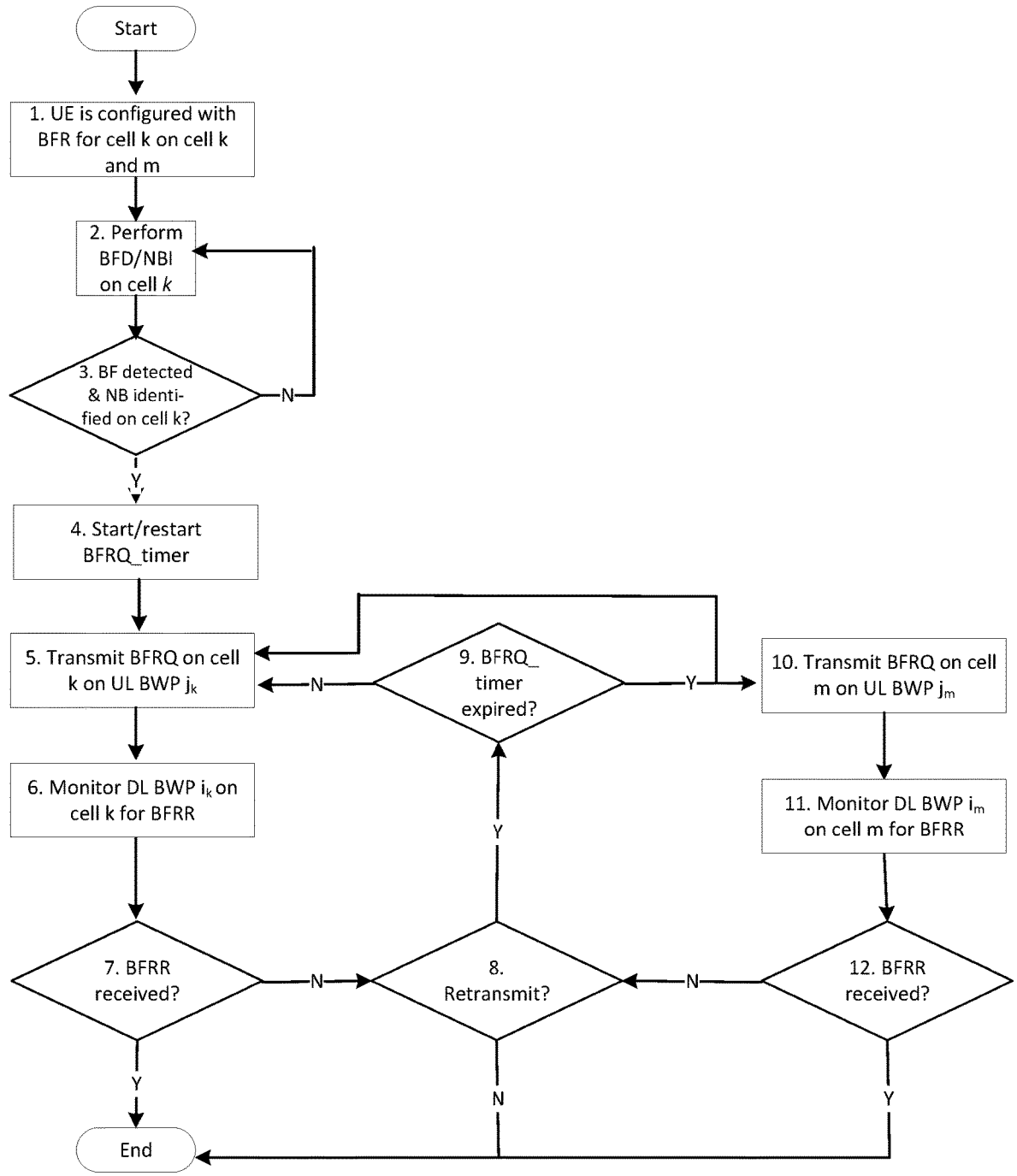
FIG. 13 shows a flowchart of an example procedure for performing parallel BFR (both BFRQ transmission and BFRR monitoring) on cell k and cell m, after timer expiry.
Figure 14:
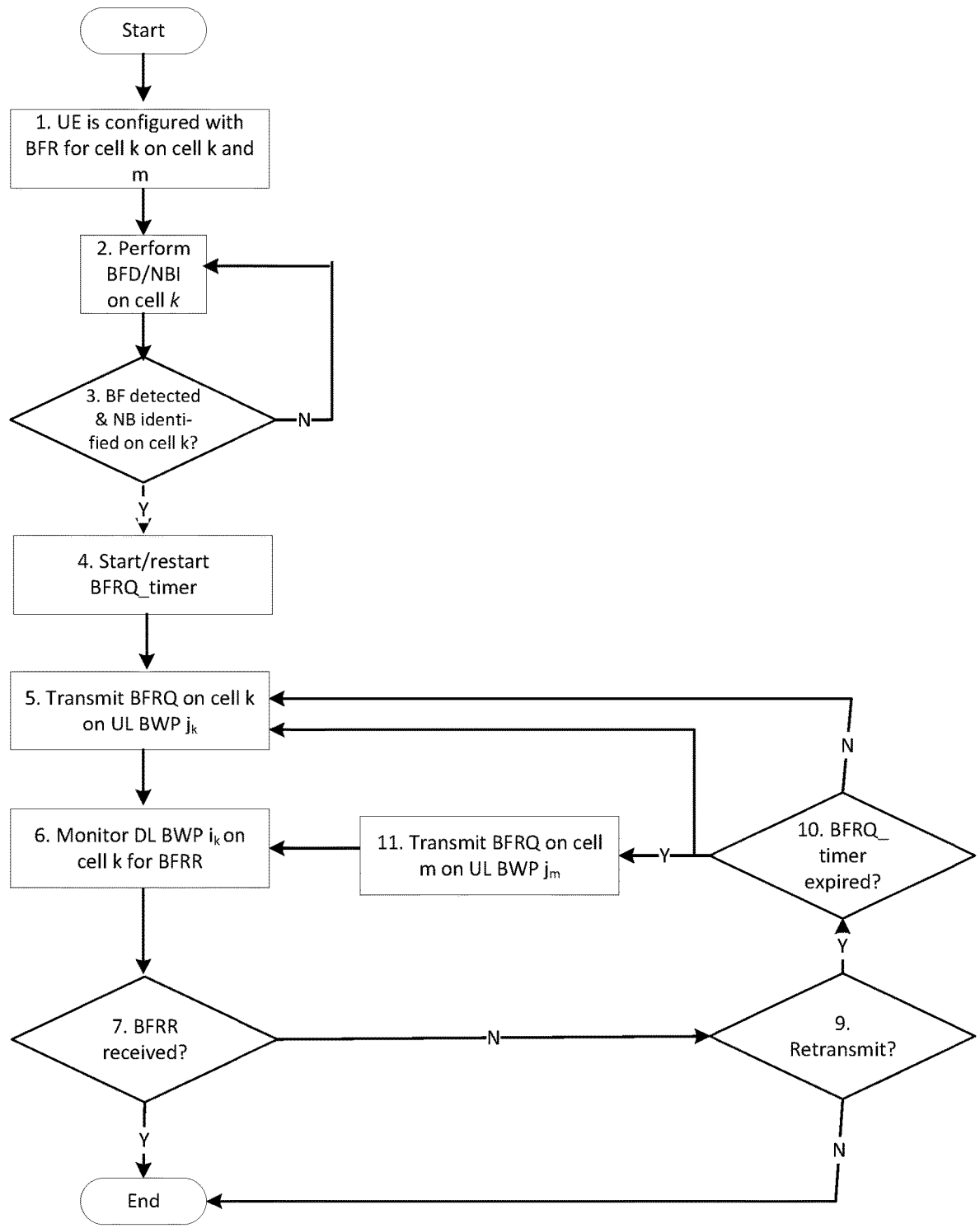
FIG. 14 shows a flowchart of an example procedure for performing parallel BFR (both BFRQ transmission and BFRR monitoring) on cell k and cell m, after timer expiry.

The example UE procedures in FIG. 9 and FIG. 10 are similar to the examples in FIG. 7 and FIG. 8. However, instead of switching between BFRQ transmissions on cell k to BFRQ transmission on cell m, the multi-carrier capable UE performs BFRQ transmission on both cell k and cell m in parallel, after N unsuccessful BFRQ transmissions/BFRR receptions.

A counter may keep track of the total number of BFRQ transmissions within the BFR procedure across all involved cells (e.g., both cell k and cell m). The total number of BFRQ transmissions may be limited. For instance, step 8 in FIG. 9 and step 9 in FIG. 10 may choose retransmission only if the total number of retransmissions is not exceeded.

A timer may be used instead of or in combination with a counter. This is illustrated in FIGS. 11-14. The timer (called BFRQ timer in the figures, could also be called beamFailureRecoveryTimer), if configured, is started upon beam failure detection and/or new beam identification. The selection of cell(s) for BFRQ depends on the timer value (e.g., if it is above a certain value or if it has expired).

UE Procedure for "Multiple" BFR Configured on Failed and/or Non-Failed Cell—BFRQ on a Second Cell (Parallel Version)

The parallel BFR on cell k and cell m may be taken one step further by possibly initiating BFRQ transmission on both cells after BFD on cell k. A benefit of this scheme would be the increased likelihood that the gNB quickly receives the BFRQ for cell k, such that the BFRR can be received quicker, thereby resolving the beam failure in a shorter time span. This may be essential for URLLC applications running in FR2, for which a failed link, even during a short time, is not acceptable.

Latency may be related to one-shot reliability, since the average latency depends on the average number of retransmissions in the BFR procedure (e.g., PRACH).

It may also be so that BFR occasions on a cell are quite sparse in time (e.g., 20 ms periodicity in a cell), but offset across cells (e.g., seen across two cells, 10 ms BFR occasion periodicity can be seen). Hence, the waiting time until the first BFRQ occasion may be shorter on average if the UE can select from multiple cells.

Another factor is that different BFR occasions (e.g., PRACH occasions) may be associated to different candidate RS. The BFR timeline may be different depending on which candidate RS the UE selects.

Figure 15:
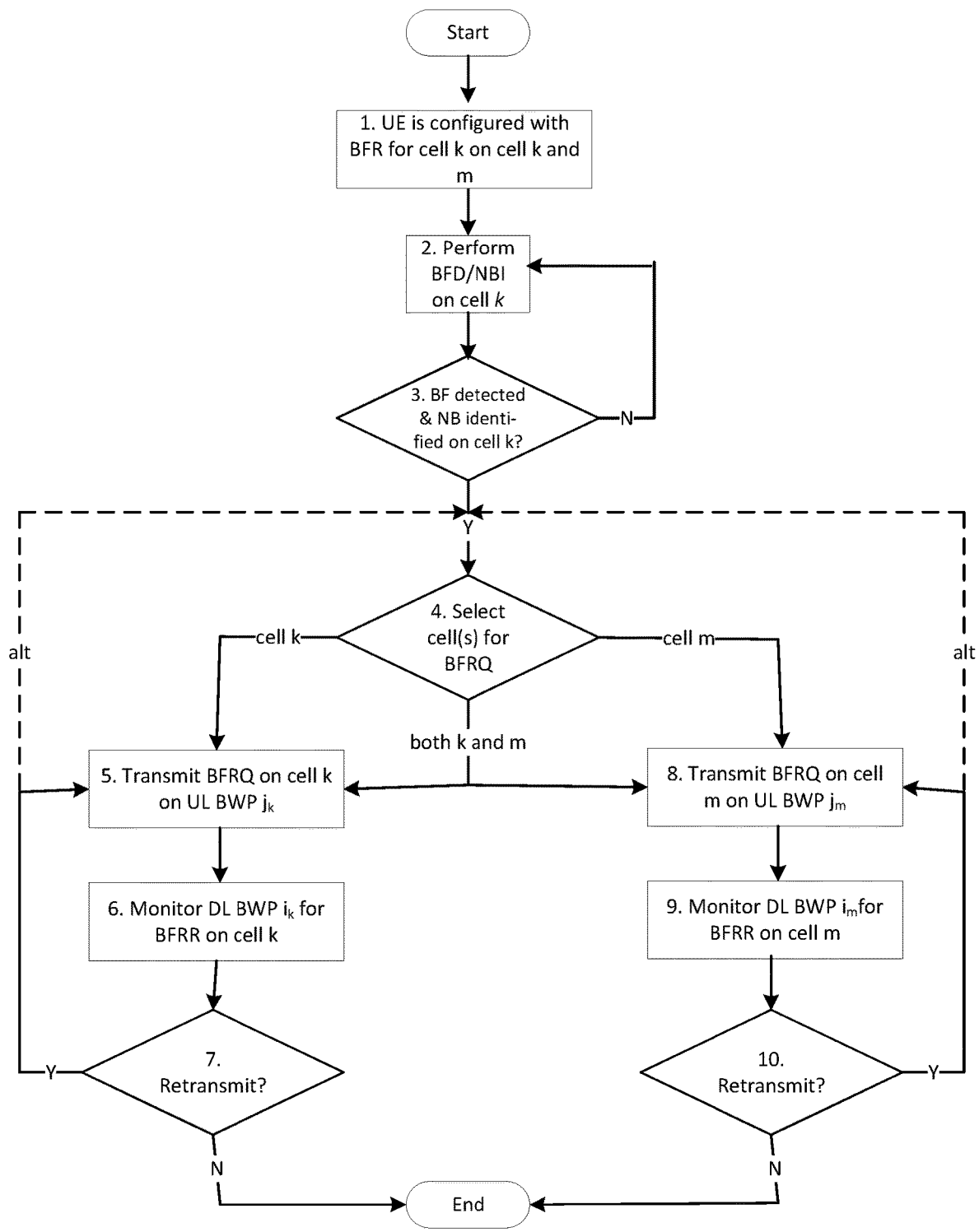
FIG. 15 shows a flowchart of an example extension of the UE procedure in FIG. 5 in which the UE selects which one or more cells to use for BFRQ. The case "both cell k and cell m" is included.
Figure 16:
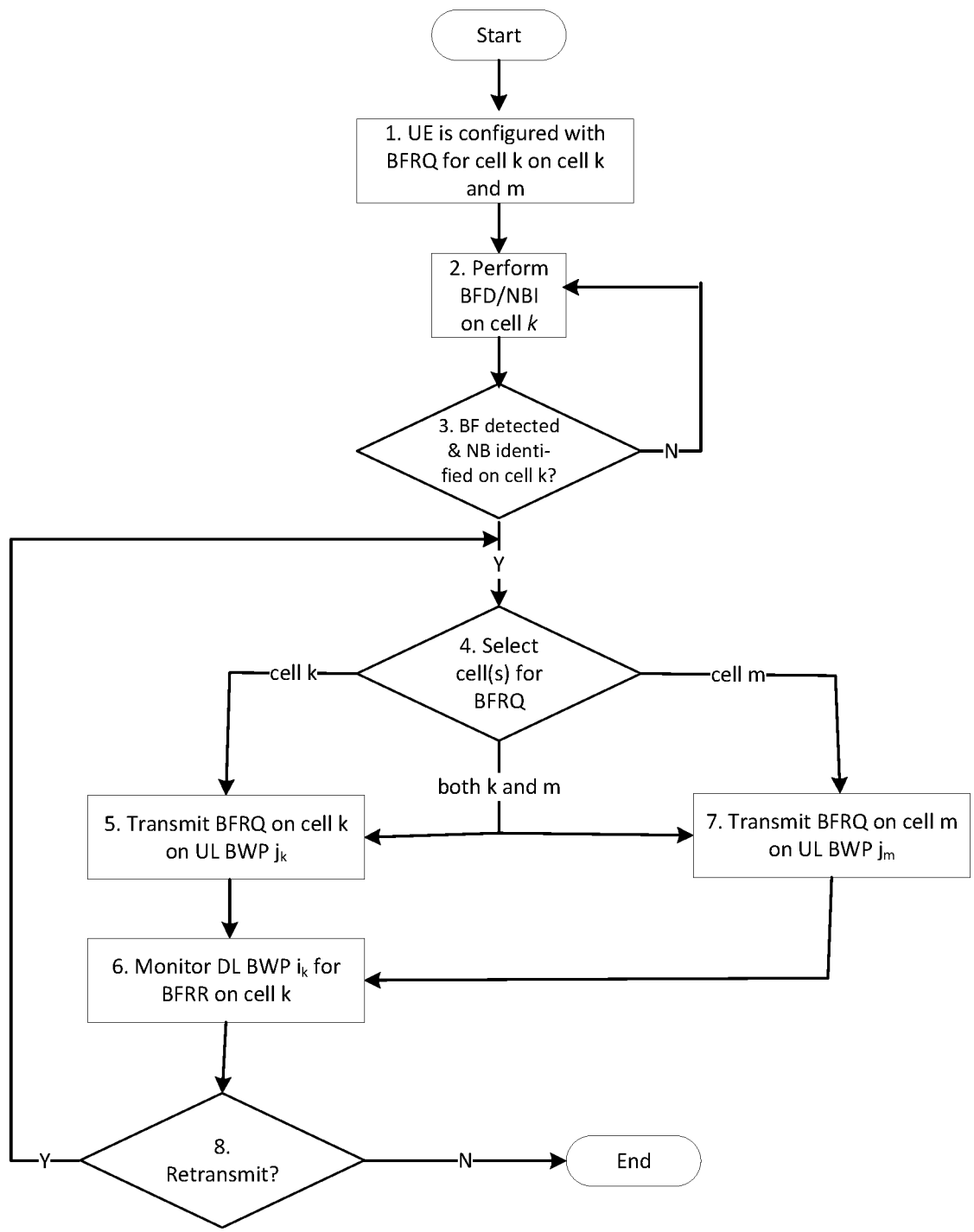
FIG. 16 shows a flowchart of an example extension of the UE procedure in FIG. 5 in which the UE selects which one or more cells to use for BFRQ. The case "both cell k and cell m" is included.

In FIG. 15 and FIG. 16, the UE selects which cell(s) to use for BFRQ transmission, for instance according the criteria discussed in connection with FIGS. 6A and 6B, with the addition that the UE may also select both cell k and cell m, when this is expected to be beneficial or according to a pre-defined or configured criterion. The difference between procedure (A) and (B) is again on which cell the UE expects to receive the corresponding BFRR.

In (A), an alternative is shown with dashed lines, in which a decision to retransmit BFRQ gives the UE the choice to which cell(s) to transmit.

Figure 17:
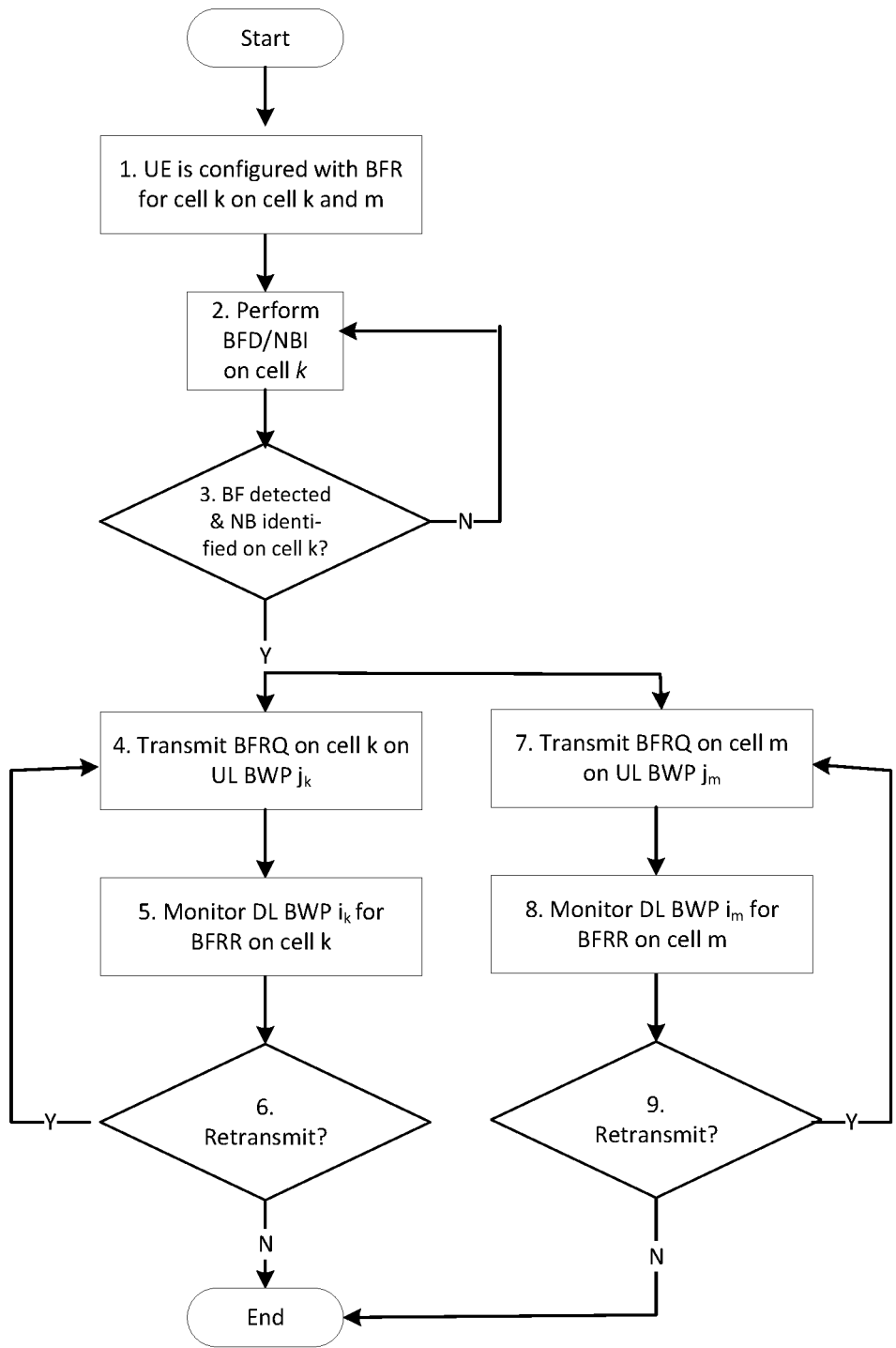
FIG. 17 shows a flowchart of an example UE procedure in which the UE transmits BFRQ on both the failed cell k and another cell m.
Figure 18:
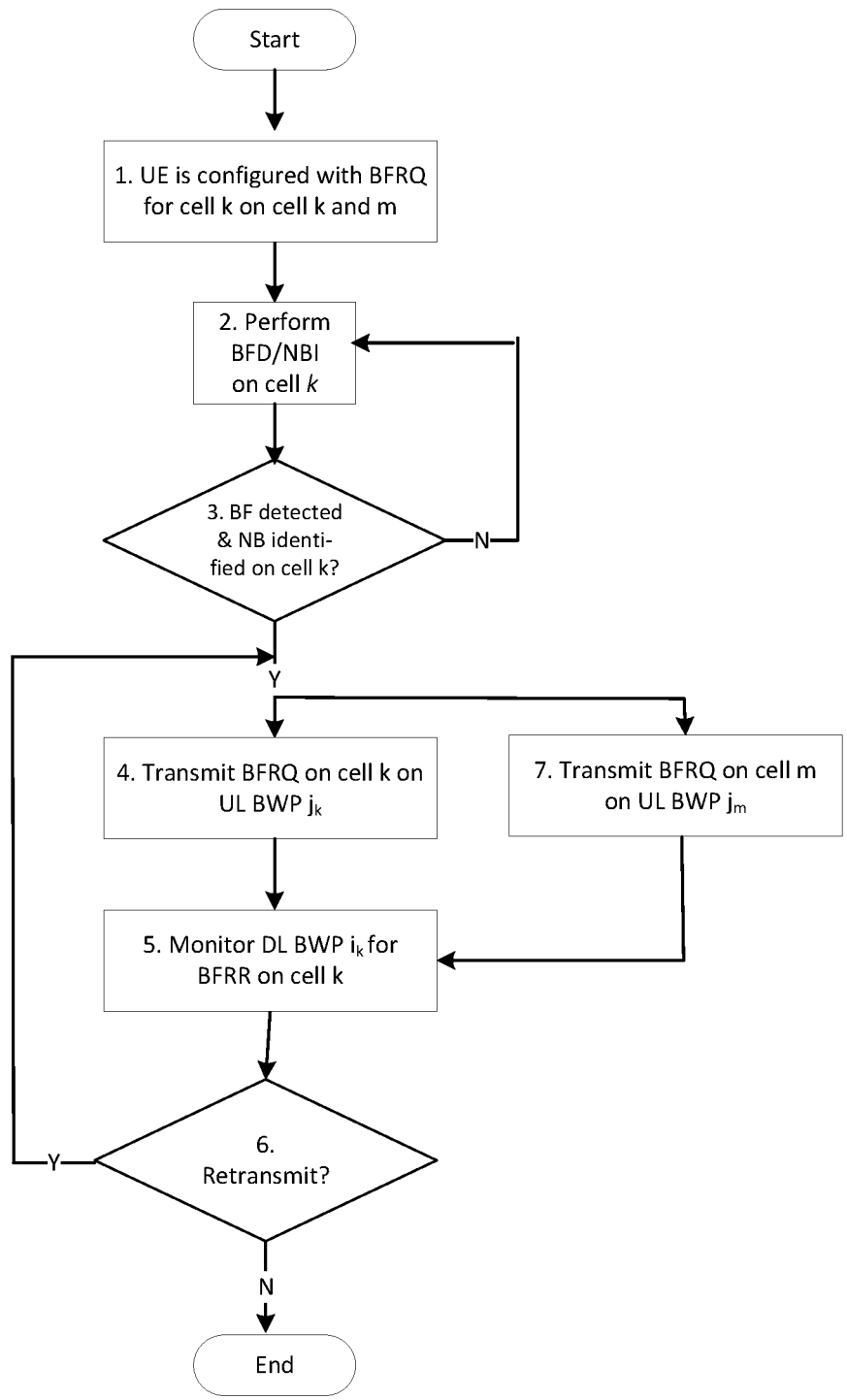
FIG. 18 shows a flowchart of an example UE procedure in which the UE transmits BFRQ on both the failed cell k and another cell m.

In FIG. 17 and FIG. 18, the UE is configured to initiate BFRQ transmission on both cell k and cell m after BFD and NBI on cell k.

The UE may select a cell (e.g., an active cell with an active UL BWP) for BFRQ transmission, in addition to, or instead of the failed cell. This may be feasible for instance in the scenario that BFRQ on a non-failed cell uses MAC CE in PUSCH and the MAC CE also indicates which cell that has failed. If the BFRQ MAC CE is supported on multiple of the UE's active cells, the UE may select the most suitable cell for the BFRQ transmission (e.g., the cell with lowest expected BFRQ transmission/reception latency and/or reliability).

A counter may keep track of the total number of BFRQ transmissions within the BFR procedure across all involved cells (e.g., both cell k and cell m). The total number of BFRQ transmissions may be limited. For instance, the retransmit steps in FIG. 15 and in FIG. 17 may choose retransmission only if the total number of retransmissions is not exceeded.

UE Procedure for Cell Group BFR

Beam failure recovery may apply to cells other than the failed cell. For example, a UE with multiple cells may update QCL relationships on non-failed cells during BFR procedure or after a successful beam failure recovery procedure. For instance, a UE may apply the QCL assumption, based on the selected candidate RS, used for the recovery search space (and corresponding recovery CORESET) on the failed cell also on one or more CORESETs on one or more non-failed cells. In some cases, the UE applies the QCL assumption in the non-failed cell at the same time as in the failed cell. In some cases, the UE applies the QCL assumption in the non-failed cell after the BFR procedure for the failed cell has successfully completed.

A candidate RS configured for BFR of a failed cell may be an RS of a non-failed cell, such as:

An SSB with cell ID of the failed cell,

An RS, (e.g., CSI-RS) transmitted, at least partly, within BWP(s) of the non-failed cell, and/or An RS (e.g., CSI-RS) configured within the Serving Cell configuration of the non-failed cell.

Only candidate RS of activated cells may be considered for new beam identification.

This functionality may be limited to the scenario in which the failed and non-failed cell are in the same frequency band.

Configuration of Enhanced BFR—Per BWP Configuration

A search space and in some cases corresponding CORESET used for recovery (e.g., BFRR) may be optionally configured per UL BWP of the failed cell, as in Rel-15. In some cases, such a configuration indicates that the BFRR may or should be monitored on a non-failed cell. The indication may be in the form a cell index/Id or a list of cells indices/Ids. In some cases, a present indication means that the SpCell (e.g., in the same group) may be or shall be used for BFRR monitoring. An indication of DL BWP in the non-failed cell may also be included.

A search space and in some cases corresponding CORESET used for recovery (e.g., BFRR) may be optionally configured per DL BWP of the failed cell (e.g., in the radio link monitoring configuration).

The search space and in some cases corresponding CORESET used for recovery (e.g., BFRR) on the non-failed cell may be optionally configured per UL BWP of the non-failed cell. The presence of such a configuration may indicate that the UE should switch active DL part for BFRR reception to the Id of the UL BWP for which the search space was configured.

The search space and in some cases corresponding CORESET used for recovery (e.g., BFRR) on the non-failed cell may be optionally configured per DL BWP of the non-failed cell (e.g., in the radio link monitoring configuration). The presence of such a configuration may indicate that the UE with the corresponding DL BWP being active could stay on the DL BWP for BFRR reception on the configured recovery search space, even if a UL BWP with Id different from the Id of the active DL BWP is being used for BFRQ. Such a configuration of recovery search space may be accompanied by an indication that the search space should or may be used in a BFR procedure for another cell. The presence of such an indication may indicate to a UE with the DL BWP being active that it should use the recovery search space in the DL BWP for BFRR monitoring and not the failed cell. The search space configured in the active DL BWP of the non-failed cell may be used for BFRR monitoring if the DL BWP configuration indicates that it could be used for non-failed cell BFRR and the configuration of the failed cell (e.g., UL and/or DL BWPs) indicates that non-failed cell BFRR could be used. Such indications could for instance be based on explicit indicator(s) or by indication through the presence of an optional configuration parameter or IE.

The CORESET for recovery may be implicitly configured through the explicit configuration of the recovery search space ID.

BFRQ may be optionally configured per UL BWP of the failed cell, as in Rel-15. Such a configuration may indicate that multi-cell BFRQ may or shall be used, for example that the UE may or shall use one or more non-failed cells for BFRQ. Further configuration details of the multi-cell BFRQ mechanism may be included, such a selection of BFRQ mechanism if multiple mechanisms are supported, or parameters for the BFRQ-cell selection criterion.

BFRQ may be optionally configured per UL BWP of a non-failed cell. Such a configuration may indicate that BFRQ in the UL BWP may or (if active) shall be used for BFRQ corresponding to BF in another failed cell. In some cases, any failed cell may use BFRQ in the UL BWP. In some cases, which other cells that may or (if active) shall use the UL BWP for BFRQ is indicated in the configuration.

In some examples, such as for unpaired spectrum, both UL- and DL-related BFR configuration for a particular BWP Id may be configured together (e.g., in the same RRC IE). This may be natural if the UE, for one particular cell, uses the same BWP Id for UL BWP and DL BWP in each time instance.

Configuration of Enhanced BFR—Per Cell Configuration

It may be optionally configured per cell (e.g., in Serving-CellConfig) which cell(s) that may or shall be used for BFRQ and/or BFRR in case the cell fails. In some cases, a cell index/Id is configured, in some cases a list of cell indices/Ids is configured. In some cases, the indication of other cell(s) for BFRQ and/or BFRR indicates that the UE may or shall use the indicated cell(s) for BFRQ and/or BFRR. In some cases, the presence of the indication means that the UE may choose the failed cell or the indicated non-failed cell(s) for BFRQ and/or BFRR. In some cases, the presence of an indication means that the UE shall use the non-failed cell(s) for BFRQ and/or BFRR. In some cases, if there are multiple cell configured for possible BFRQ and/or BFRR transmission (e.g., multiple non-failed cells are configured), it may be up to the UE to select which of the cells to use. The UE may use a predefined criterion for selecting cell for BFRQ and/or BFRR (e.g., the cell with lowest index that is activated). In some cases, it is indicated per SCell (e.g., ServingCellConfig) if the SpCell in the cell group may or shall be used for BFRQ and/or BFRR.

It may be optionally configured per cell (e.g., in Serving-CellConfig) if the cell may be used for BFRQ and/or BFRR for another cells beam failure (e.g., that non-failed cell BFRQ and/or BFRR may be used on the cell)

Such per cell configuration may include parameters for a selection criterion used for selecting which cell(s) to use for BFRQ and/or BFRR.

Configuration of Enhanced BFR—Per Cell Group (e.g., MCG/SCG) Configuration

The cell(s) to use for BFRQ and/or BFRR may be optionally configured per cell group (e.g., per MCG and/or SCG). For cell group BFR, a candidate RS configured for a cell/BWP may be an RS (e.g., SSB) of another cell (e.g., another serving cell). A candidate RS configuration may include a cell index, such as a serving cell index, one or more SSB indexes.

A UE may be configured to apply a QCL assumption to one or more CORESETs of one or more cells when another cell has successfully completed BFR.

Configuration of Enhanced BFR—Other Configuration Enhancements

A set of RS for beam failure detection may be configured with RRC signaling. In some cases, lower layer signaling (e.g., MAC CE or DCI) may indicate a subset of the RRC configured RS to be used for BFD (e.g., the RRC-configured RS is a set of potential BFD RS). The MAC CE may select a subset of the RRC configured set, while a DCI may select a subset of the MAC CE selected subset.

A set of candidate RS for new beam identification may be configured with RRC signaling. In some cases, lower layer signaling (e.g., MAC CE or DCI) indicates a subset of the RRC configured candidate RS to be used for NBI (e.g., the RRC-configured candidate RS is a set of potential candidate RS). The MAC CE may select a subset of the RRC configured set, while a DCI selects a subset of the MAC CE selected subset.

For the BFD/candidate RS configuration using RRC/MAC CE/DCI described above, the RRC configuration may divide the set of RS into subsets (disjoint or overlapping), while the MAC CE and/DCI select one of these subsets (e.g., by indicating an RS subset index).

The following is a list of acronyms relating to service layer technologies that may appear in the above description. Unless otherwise specified, the acronyms used herein refer to the corresponding term listed below:

BF Beam Failure
BFD Beam Failure Detection
BFR Beam Failure Recovery
BFRQ Beam Failure Recovery ReQuest
BFRR Beam Failure Recovery Response
BWP BandWidth Part
CBRA Contention-based Random Access
CFRA Contention-free Random Access
CORESET Control Resource Set
C-RNTI Cell Radio-Network Temporary Identifier
CSI-RS Channel State Information Reference Signal
DCI Downlink Control Information
DL Downlink
eMBB enhanced Mobile Broadband
FDD Frequency Division Duplex
FR1 Frequency Range 1 (low frequencies, e.g., below 6 GHz)
FR2 Frequency Range 2 (high frequencies, e.g., above 6 GHz)
gNB NR NodeB
IE Information Element
LTE Long Term Evolution
MAC Medium Access Control
MAC CE MAC Control Element
MCG Master Cell Group
MIB Master Information Block NB New Beam
NBI New Beam Identification
NR New Radio
NZP Non-zero Power
OFDM Orthogonal Frequency Division Multiplexing
PBCH Physical Broadcast Channel
PCell Primary Cell
PDCCH Physical Downlink Control CHannel
PDSCH Physical Downlink Shared CHannel
PUCCH Physical Uplink Control CHannel
PUSCH Physical Uplink Shared CHannel
PHY Physical Layer
PRACH Physical Random Access Channel
PSCell Primary SCG Cell
QCL Quasi Co-location
RA Random Access
RACH Random Access Channel
RAN Radio Access Network
RLM Radio Link Monitoring
RNTI Radio Network Temporary Identification
RRC Radio Resource Control
RS Reference Signal
RSRP Reference Signal Received Power
SCell Secondary Cell
SCG Secondary Cell Group
SpCell Special Cell (PCell or PSCell)
SR Scheduling Request
SS Synchronization Signal
SSB SS/PBCH Block
TAG Timing Advance Group
TDD Time Division Duplex
TRS Tracking Reference Signal
TTI Transmission Time Interval
UCI Uplink Control Information
UE User Equipment
UL Uplink

What is claimed is:

1. A method performed by a wireless transmit/receive unit (WTRU), the method comprising:
performing a beam failure detection operation on a first cell;
detecting beam failure on the first cell;
measuring one or more candidate reference signals (RS) configured in the first cell;
transmitting a scheduling request on a physical uplink control channel (PUCCH) of an active uplink bandwidth part of a second cell based at least on detecting the beam failure on the first cell and on determining that a physical uplink shared channel (PUSCH) transmission grant is not available for transmitting a beam failure recovery request (BFRQ) medium access control (MAC) control element (CE) (BFRQ MAC CE);
transmitting the BFRQ MAC CE in a PUSCH transmission, wherein the BFRQ MAC CE includes an indication of a serving cell index of the first cell and an indication of an index associated with one of the measured one or more candidate RS associated with a RS received power (RSRP) above a threshold; and
receiving a beam failure recovery response on an active downlink bandwidth part of the second cell after transmission of the BFRQ MAC CE in the PUSCH transmission, wherein the beam failure recovery response corresponds to a physical downlink control channel (PDCCH) transmission.

2. The method of claim 1, wherein transmitting the BFRQ MAC CE comprises transmitting the PUSCH transmission carrying the BFRQ MAC CE on the first cell if a PUSCH transmission grant for carrying the BFRQ MAC CE is available on the first cell, or transmitting the scheduling request on PUCCH on the second cell and then transmitting the PUSCH transmission carrying the BFRQ MAC CE on the second cell.

3. The method of claim 1, wherein the PUSCH transmission comprises a Msg3 PUSCH transmission in a contention-based random access (CBRA) procedure.

4. The method of claim 3, wherein the Msg3 PUSCH transmission carries the BFRQ MAC CE and a Cell Radio Network Temporary Identifier cell radio-network temporary identifier (C-RNTI) MAC CE.

5. The method of claim 1, wherein the first cell comprises one or more of a primary cell, a primary secondary cell group cell, or a secondary cell.

6. The method of claim 1, wherein the BFRQ comprises one or more of:
an index associated with a configured candidate reference signal on the first cell;
a synchronization signal/physical broadcast channel index associated with the first cell; or
an index associated with a non-zero power channel state information reference signal.

7. A wireless transmit/receive unit (WTRU) comprising a processor, the processor configured to:
perform a beam failure detection operation on a first cell;
detect beam failure on the first cell;
measure one or more candidate reference signals (RS) configured in the first cell;
transmit a scheduling request on a physical uplink control channel (PUCCH) of an active uplink bandwidth part of a second cell based at least on detecting the beam failure on the first cell and on determining that a physical uplink shared channel (PUSCH) transmission grant is not available for transmitting a beam failure recovery request (BFRQ) medium access control (MAC) control element (CE) (BFRQ MAC CE);
transmit the BFRQ MAC CE in a PUSCH transmission, wherein the BFRQ MAC CE includes an indication of a serving cell index of the first cell and an indication of an index associated with one of the measured one or more candidate RS associated with a RS received power (RSRP) above a threshold; and
receive a beam failure recovery response on an active downlink bandwidth part of the second cell after transmission of the BFRQ MAC CE in the PUSCH transmission, wherein the beam failure recovery response corresponds to a physical downlink control channel (PDCCH) transmission.

8. The WTRU of claim 7, wherein the processor configured to transmit the BFRQ MAC CE comprises the processor being configured to transmit the PUSCH transmission carrying the BFRQ MAC CE on the first cell if a PUSCH transmission grant for carrying the BFRQ MAC CE is available on the first cell, or transmit the scheduling request on PUCCH on the second cell and then transmit the PUSCH transmission carrying the BFRQ MAC CE on the second cell.

9. The WTRU of claim 7, wherein the PUSCH transmission comprises a Msg3 PUSCH transmission in a contention-based random access (CBRA) procedure.

10. The WTRU of claim 9, wherein the Msg3 PUSCH transmission carries the BFRQ MAC CE and cell radio-network temporary identifier (C-RNTI) MAC CE.

11. The WTRU of claim 7, wherein the first cell comprises one or more of a primary cell, a primary secondary cell group cell, or a secondary cell.

12. The WTRU of claim 7, wherein the BFRQ beam failure recovery request comprises one or more of:
- an index associated with a configured candidate reference signal on the first cell;
- a synchronization signal/physical broadcast channel index associated with the first cell;
- or an index associated with a non-zero power channel state information reference signal.

13. A computer-readable storage medium storing instructions which, when executed by a processor, cause the processor to:
- perform a beam failure detection operation on a first cell;
- detect beam failure on the first cell;
- measure one or more candidate reference signals (RS) configured in the first cell;
- transmit a scheduling request on a physical uplink control channel (PUCCH) of an active uplink bandwidth part of a second cell based at least on detecting the beam failure on the first cell and on determining that a physical uplink shared channel (PUSCH) transmission grant is not available for transmitting a beam failure recovery request (BFRQ) medium access control (MAC) control element (CE) (BFRQ MAC CE);
- transmit the BFRQ MAC CE in a PUSCH transmission, wherein the BFRQ MAC CE includes an indication of a serving cell index of the first cell and an indication of an index associated with one of the measured one or more candidate RS associated with a RS received power (RSRP) above a threshold; and
- receive a beam failure recovery response on an active downlink bandwidth part of the second cell after transmission of the BFRQ MAC CE in the PUSCH transmission, wherein the beam failure recovery response corresponds to a physical downlink control channel (PDCCH) transmission.

14. The computer-readable storage medium of claim 13, wherein the instructions, when executed by the processor, causing the processor to transmit the BFRQ MAC CE comprises the instructions, when executed by the processor, being configured to cause the processor to transmit the PUSCH transmission carrying the BFRQ MAC CE on the first cell if a PUSCH transmission grant for carrying the BFRQ MAC CE is available on the first cell, or transmit the scheduling request on PUCCH on the second cell and then transmitting the PUSCH transmission carrying the BFRQ MAC CE on the second cell.

15. The computer-readable storage medium of claim 13, wherein the PUSCH transmission comprises a Msg3 PUSCH transmission in a contention-based random access (CBRA) procedure.

16. The computer-readable storage medium of claim 15, wherein the Msg3 PUSCH transmission carries the BFRQ MAC CE and a cell radio-network temporary identifier (C-RNTI) MAC CE.

17. The computer-readable storage medium of claim 13, wherein the first cell comprises one or more of a primary cell, a primary secondary cell group cell, or a secondary cell.

18. The computer-readable storage medium of claim 13, wherein the BFRQ comprises one or more of:
- an index associated with a configured candidate reference signal on the first cell;
- a synchronization signal/physical broadcast channel index associated with the first cell; or
- an index associated with a non-zero power channel state information reference signal.

* * * * *

UNITED STATES PATENT AND TRADEMARK OFFICE
CERTIFICATE OF CORRECTION

PATENT NO. : 12,149,317 B2  
APPLICATION NO. : 17/289051  
DATED : November 19, 2024  
INVENTOR(S) : Patrick Svedman et al.

Page 1 of 1

It is certified that error appears in the above-identified patent and that said Letters Patent is hereby corrected as shown below:

In the Claims

In Claim 4: Column 34, Line 10, delete "Cell Radio Network Temporary Identifier".

Signed and Sealed this  
Twenty-fifth Day of February, 2025

Coke Morgan Stewart  
*Acting Director of the United States Patent and Trademark Office*